(12) United States Patent
Liu et al.

(10) Patent No.: US 10,445,898 B2
(45) Date of Patent: Oct. 15, 2019

(54) SYSTEM AND METHOD FOR CAMERA CALIBRATION BY USE OF ROTATABLE THREE-DIMENSIONAL CALIBRATION OBJECT

(71) Applicant: SONY CORPORATION, Tokyo (JP)

(72) Inventors: Cheng-Yi Liu, San Jose, CA (US); Alexander Berestov, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/016,936

(22) Filed: Feb. 5, 2016

(65) Prior Publication Data
US 2017/0228864 A1 Aug. 10, 2017

(51) Int. Cl.
*G06T 7/80* (2017.01)
*H04N 17/00* (2006.01)
*H04N 13/246* (2018.01)

(52) U.S. Cl.
CPC ............ *G06T 7/80* (2017.01); *H04N 13/246* (2018.05); *H04N 17/002* (2013.01)

(58) Field of Classification Search
CPC ... G06T 7/0018; G06T 7/0022; G06T 7/0044; G06T 17/00; H04N 13/246; H04N 17/002
See application file for complete search history.

(56) References Cited

U.S. PATENT DOCUMENTS

| | | | | |
|---|---|---|---|---|
| 6,437,823 B1 * | 8/2002 | Zhang | .................. | H04N 17/002 348/187 |
| 6,563,499 B1 * | 5/2003 | Waupotitsch | ......... | G06T 11/001 345/420 |
| 6,917,702 B2 | 7/2005 | Beardsley | | |
| 7,295,698 B2 * | 11/2007 | Miyoshi | ................ | G03B 17/00 382/154 |
| 7,440,691 B2 * | 10/2008 | Beniyama | ................ | G03D 9/02 396/325 |
| 7,912,673 B2 * | 3/2011 | Hebert | ................ | G01B 11/245 356/603 |
| 7,995,098 B2 * | 8/2011 | Pedeville | ............... | H04N 17/04 348/177 |
| 8,184,144 B2 * | 5/2012 | Chen | ..................... | G06T 7/0018 345/421 |
| 8,194,136 B1 * | 6/2012 | Askey | ................ | G01M 11/0264 348/175 |

(Continued)

*Primary Examiner* — Brian P Yenke
(74) *Attorney, Agent, or Firm* — Chip Law Group

(57) ABSTRACT

Various aspects of a system and a method for camera calibration by use of a rotatable three-dimensional (3-D) calibration object are disclosed herein. In accordance with an embodiment, the system includes a first electronic device, which determines a rotation pattern of the 3-D calibration object, based on a set of pre-selected images. The set of pre-selected images includes the 3-D calibration object captured at pre-defined viewing angles. Control information is communicated by the first electronic device to a second electronic device associated with the 3-D calibration object to rotate the 3-D calibration object in accordance with the determined rotation pattern. A plurality of image frames of the 3-D calibration object are captured to calibrate intrinsic and/or extrinsic camera parameters of the first electronic device.

22 Claims, 11 Drawing Sheets

(56) References Cited

U.S. PATENT DOCUMENTS

| | | | | |
|---|---|---|---|---|
| 8,416,236 B1* | 4/2013 | Hickman | | G06T 19/20 345/419 |
| 8,619,144 B1* | 12/2013 | Chang | | H04N 17/002 348/180 |
| 8,818,132 B2* | 8/2014 | Zhang | | G06T 7/0018 382/154 |
| 8,917,317 B1* | 12/2014 | Beeler | | G01B 11/2504 348/47 |
| 9,117,267 B2* | 8/2015 | Francis, Jr. | | G01B 11/2513 |
| 9,163,938 B2* | 10/2015 | Poursohi | | G01B 11/2513 |
| 9,188,973 B2* | 11/2015 | Tenney | | G06T 7/002 |
| 9,201,424 B1* | 12/2015 | Ogale | | G05D 1/0094 |
| 9,286,718 B2* | 3/2016 | Wang | | G06T 19/00 |
| 9,432,655 B2* | 8/2016 | Lee | | H04N 13/0221 |
| 9,928,595 B2* | 3/2018 | Martinello | | G06T 7/80 |
| 10,210,615 B2* | 2/2019 | Liu | | G06T 7/85 |
| 2001/0033685 A1* | 10/2001 | Ishiyama | | G06K 9/00221 382/154 |
| 2002/0041282 A1* | 4/2002 | Kitaguchi | | G01B 11/2545 345/418 |
| 2002/0050988 A1* | 5/2002 | Petrov | | G06K 9/20 345/418 |
| 2003/0066949 A1* | 4/2003 | Mueller | | G01B 11/00 250/208.1 |
| 2004/0042649 A1* | 3/2004 | Arai | | G06T 7/0018 382/154 |
| 2004/0247174 A1* | 12/2004 | Lyons | | G06F 3/04845 382/154 |
| 2005/0083409 A1* | 4/2005 | Li | | H04N 13/0221 348/207.99 |
| 2008/0031514 A1 | 2/2008 | Kakinami | | |
| 2009/0086081 A1* | 4/2009 | Tan | | G01B 11/25 348/333.1 |
| 2009/0209343 A1* | 8/2009 | Foxlin | | G07F 17/32 463/36 |
| 2011/0135190 A1* | 6/2011 | Maad | | A61B 6/0407 382/154 |
| 2012/0075435 A1* | 3/2012 | Hovanky | | H04N 13/02 348/51 |
| 2012/0287232 A1 | 11/2012 | Natroshvili et al. | | |
| 2014/0118500 A1* | 5/2014 | Liu | | H04N 13/0203 348/46 |
| 2015/0138349 A1 | 5/2015 | Hebert et al. | | |
| 2015/0187108 A1* | 7/2015 | Mullins | | G06T 19/006 345/633 |
| 2015/0187138 A1* | 7/2015 | Mullins | | G06T 19/006 345/633 |
| 2015/0256815 A1* | 9/2015 | Grafulla-Gonzalez | | G06T 7/002 348/46 |
| 2016/0134860 A1* | 5/2016 | Jovanovic | | G01B 21/042 348/50 |
| 2016/0150217 A1* | 5/2016 | Popov | | G06T 15/04 348/48 |
| 2016/0198088 A1* | 7/2016 | Wang | | H04N 5/23238 348/36 |
| 2017/0193705 A1* | 7/2017 | Mullins | | G06T 19/006 |
| 2017/0221210 A1* | 8/2017 | Martinello | | G06T 7/0018 348/188 |
| 2017/0223322 A1* | 8/2017 | Grundhofer | | H04N 9/3185 |
| 2017/0262971 A1* | 9/2017 | Liu | | G06T 7/002 |
| 2019/0102911 A1* | 4/2019 | Natroshvili | | B60R 1/00 |

* cited by examiner

SYSTEM AND METHOD FOR CAMERA CALIBRATION BY USE OF ROTATABLE THREE-DIMENSIONAL CALIBRATION OBJECT

CROSS-REFERENCE TO RELATED APPLICATIONS/INCORPORATION BY REFERENCE

None.

FIELD

Various embodiments of the disclosure relate to a system and method for camera calibration. More specifically, various embodiments of the disclosure relate to system and method for camera calibration by use of a rotatable three-dimensional (3-D) calibration object.

BACKGROUND

Geometric camera calibration is a technique that estimates various parameters of a lens and image sensors of an image-capturing device, such as a camera. Usually, such parameters may refer to intrinsic and extrinsic camera parameters and distortion coefficients. Currently, the time required to calibrate intrinsic parameters of a camera may be proportional to the number of cameras in an imaging environment. This may involve manual capture of several images and computation of the intrinsic parameters by each camera in turns. Calibration of the extrinsic parameters may also depend on the intrinsic parameters. Thus, conventional camera calibration techniques for the intrinsic and/or extrinsic camera parameters may be a time-consuming process.

In certain scenarios, intrinsic and/or extrinsic camera parameter estimation techniques may employ a fixed two-dimensional (2-D) calibration object or texture pattern. In such scenarios, the position of each camera may be restricted by a viewing angle so that the texture pattern is discernible by the cameras. In certain other scenarios, camera extrinsic parameter estimation techniques may employ a three-dimensional (3-D) calibration object. A perspective distortion may make feature point detection and precise camera positioning more difficult. Thus, an advanced system and/or technique may be required for a quick and automated calibration of intrinsic and/or extrinsic camera parameters of one or more cameras, with increased accuracy.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method are provided for camera calibration by use of a rotatable three-dimensional (3-D) calibration object substantially as shown in, and/or described in connection with, at least one of the figures, as set forth more completely in the claims.

These and other features and advantages of the present disclosure may be appreciated from a review of the following detailed description of the present disclosure, along with the accompanying figures, in which like reference numerals refer to like parts throughout.

DETAILED DESCRIPTION

Figure 1A:
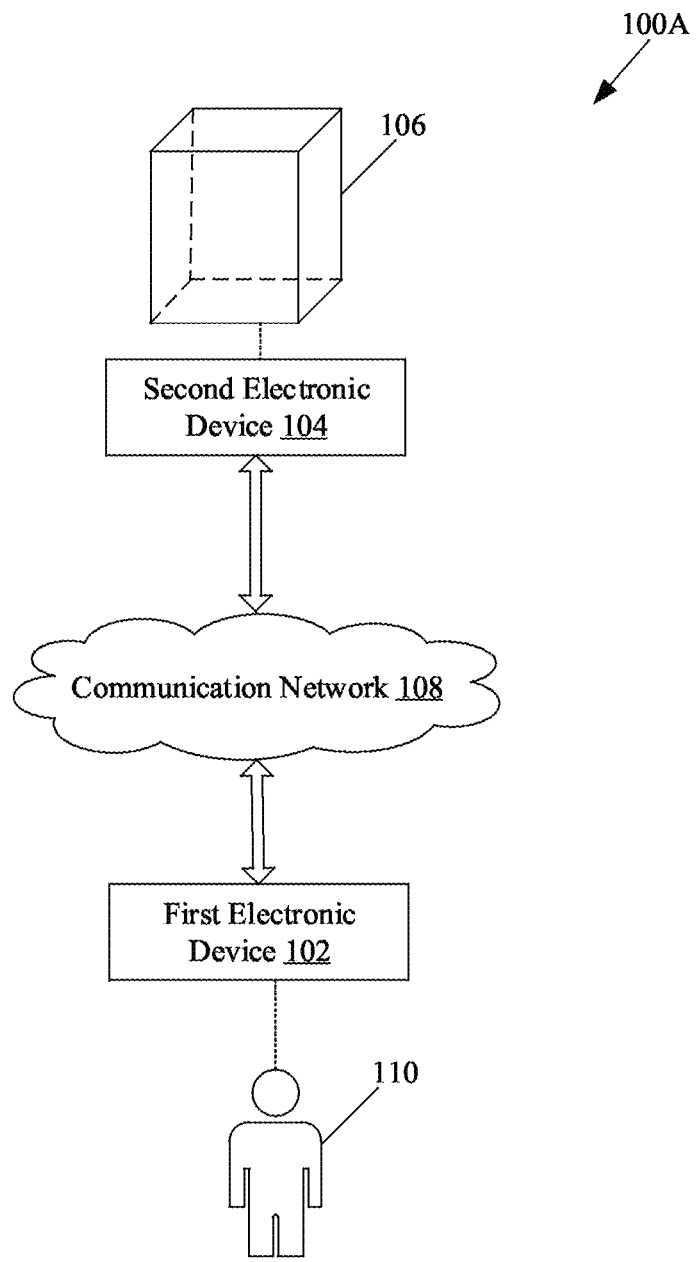
FIG. 1A is a block diagram that illustrates a network environment for camera calibration by use of a rotatable 3-D calibration object, in accordance with an embodiment of the disclosure.

The following described implementations may be found in the disclosed system and method for camera calibration by use of a rotatable three-dimensional (3-D) calibration object. Exemplary aspects of the disclosure may include a first electronic device, which may determine a rotation pattern of a three-dimensional (3-D) calibration object. The rotation pattern may be determined based on a set of pre-selected images. The set of pre-selected images may include a two-dimensional (2-D) texture pattern captured at pre-defined viewing angles. Control information may be communicated to a second electronic device associated with the 3-D calibration object. The control information may be communicated to rotate the 3-D calibration object in accordance with the determined rotation pattern. A plurality of image frames of the 3-D calibration object may be captured to calibrate intrinsic and/or extrinsic camera parameters of the first electronic device.

In accordance with an embodiment, the first electronic device may correspond to an imaging device that may capture the plurality of image frames of the 3-D calibration object. In accordance with an embodiment, the first electronic device may correspond to a computing device that may be communicatively coupled to a plurality of imaging devices.

In accordance with an embodiment, the second electronic device may be configured to rotate the 3-D calibration object on horizontal and/or vertical axes. The rotation may be based on receipt of the communicated control information from the first electronic device, or pre-stored control information at the second electronic device.

In accordance with an embodiment, the required angle at which the first electronic device may capture the plurality of image frames of the 3-D calibration object may be determined. In such an embodiment, the first electronic device may be the imaging device. The angle may be determined for calibration of the intrinsic and/or the extrinsic camera parameters.

In accordance with an embodiment, position information of a plurality of imaging devices may be received. In such an embodiment, the first electronic device may be the computing device. The position information of the plurality of imaging devices may be used to determine an angle at which each of the plurality of imaging devices requires the capture of the plurality of image frames of the 3-D calibration object for the calibration of the intrinsic and/or the extrinsic camera parameters of the plurality of imaging devices.

In accordance with an embodiment, the 3-D calibration object may include one or more façades. Each façade of the one or more façades may include a unique identifier at a pre-defined position and/or a pre-defined texture pattern that may correspond to the 2-D texture pattern. A plurality of feature points may be detected in each of the captured plurality of image frames. The plurality of feature points may correspond to the unique identifier and/or the pre-defined texture pattern of the 3-D calibration object.

In accordance with an embodiment, the captured plurality of image frames of the 3-D calibration object may be received from each of the plurality of imaging devices. The plurality of image frames may be captured by each of the plurality of imaging devices for parallel computation of the calibration of the intrinsic and/or the extrinsic camera parameters of the plurality of imaging devices. The plurality of imaging devices may be positioned around the 3-D calibration object.

In accordance with an embodiment, the plurality of image frames of the 3-D calibration object may be captured at different rotation states of the 3-D calibration object for the calibration of the intrinsic and/or the extrinsic camera parameters of the first electronic device. In accordance with an embodiment, a similarity related to distribution of a plurality of feature points between each of the captured plurality of image frames, and at least one of the set of pre-selected images, may be determined.

In accordance with an embodiment, an image frame from the captured plurality of image frames may be selected. The selection may be based on the determined similarity for the calibration of the intrinsic camera parameters of the first electronic device. In accordance with an embodiment, another rotation pattern of the 3-D calibration object may be determined for the calibration of the extrinsic camera parameters for the first electronic device.

In accordance with an embodiment, a time-of-capture of the plurality of image frames of the 3-D calibration object may be synchronized to each rotation state of the 3-D calibration object at a specific angle. The synchronization may be based on the determined rotation pattern and/or other rotation pattern.

In accordance with an embodiment, a 2-D to 3-D mapping of each image frame of the captured plurality of image frames may be determined for the calibration of the extrinsic camera parameters for the first electronic device. The 2-D to 3-D mapping may be determined based on the synchronization, the estimated camera intrinsic parameters, and pre-stored 3-D world coordinates of the plurality of feature points on the 3-D calibration object.

FIG. 1A is a block diagram that illustrates a network environment for camera calibration by use of a rotatable three-dimensional calibration object, in accordance with an embodiment of the disclosure. With reference to FIG. 1A, there is shown an exemplary network environment 100A. The network environment 100A may include a first electronic device 102, a second electronic device 104, a three-dimensional (3-D) calibration object 106, a communication network 108, and one or more users, such as a user 110. The first electronic device 102 may be communicatively coupled to the second electronic device 104, via the communication network 108. The second electronic device 104 may be associated with the 3-D calibration object 106. The user 110 may be associated with the first electronic device 102.

The first electronic device 102 may comprise suitable logic, circuitry, interfaces, and/or code that may be configured to communicate with the second electronic device 104. Examples of the first electronic device 102 may include, but are not limited to, an imaging device, such as a camera, a camcorder, an image- or video-processing device, a motion-capture system, and/or a projector. In accordance with an embodiment, the first electronic device 102 may be implemented as a computing device (as described in FIG. 1B).

The second electronic device 104 may comprise suitable logic, circuitry, interfaces, and/or code that may be configured to receive instructions from the first electronic device 102, via the communication network 108. The second electronic device 104 may be configured to rotate the 3-D calibration object 106 in a 3-axes rotation.

Figure 1B:
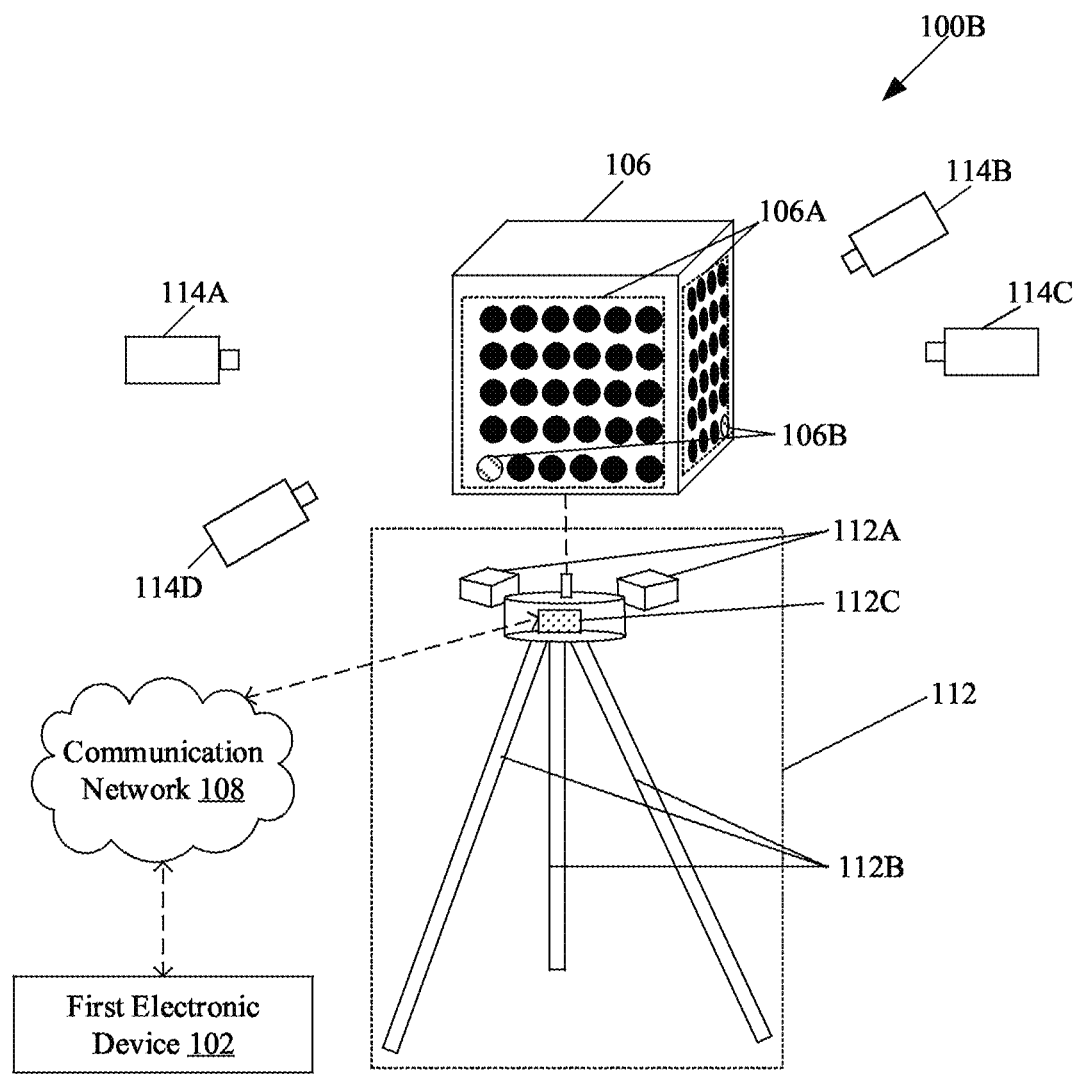
FIG. 1B is a block diagram that illustrates another network environment for camera calibration by use of a rotatable 3-D calibration object, in accordance with an embodiment of the disclosure.

The 3-D calibration object 106 may have various geometrical shapes, such as a cube or a polyhedron. The 3-D calibration object 106 may comprise one or more façades with a pre-defined 2-D texture pattern. In accordance with an embodiment, the one or more façades may have a same pre-defined texture pattern. The pre-defined texture pattern may be a homogenous or a heterogeneous texture pattern. In accordance with an embodiment, certain façades may have the same pre-defined texture pattern, whereas certain other façades of the 3-D calibration object 106 may have a different pre-defined texture pattern. In accordance with an embodiment, based on an implementation requirement, a single façade may be the same or different 2-D texture pattern. An example of the 3-D calibration object 106 is shown in FIG. 1B, where the 3-D calibration object 106 includes four façades with homogenous shape and homogenous 2-D texture pattern, and two façades devoid of the 2-D texture pattern.

In accordance with an embodiment, in addition to the pre-defined texture pattern, each façade may also include a unique identifier at a pre-defined position of the façade. For instance, the unique identifier may be a colored mark or other unique mark, positioned at a unique region of each façade. The unique identifier may be positioned such that the detection of the plurality of feature points on each façade may not be affected. The 3-D calibration object 106 may be rotatable in a 3-axes rotation by the second electronic device 104.

The communication network 108 may include a medium through which the first electronic device 102 and the second electronic device 104, may communicate with each other. The communication network 108 may be a wired or wireless communication network. Examples of the communication network 108 may include, but are not limited to, a Local Area Network (LAN), a Wireless Local Area Network (WLAN), a cloud network, a Long Term Evolution (LTE)

network, a plain old telephone service (POTS), a Metropolitan Area Network (MAN), and/or the Internet. Various devices in the network environment 100A may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols.

In accordance with an embodiment, the first electronic device 102 may be an imaging device to be calibrated. The first electronic device 102 may be configured to capture a plurality of images of a pre-defined 2-D texture pattern, with different viewing angles. For instance, at +45°, +30°, 0°, −30°, −45° horizontal orientation, and −15°, 0°, +15° vertical orientation (or tilt angle), the plurality of images may be captured as candidate images from pre-specified position (s) (such as known real-world coordinates) of the first electronic device 102. The plurality of images may be candidate images to learn certain images for calibration of intrinsic camera parameters.

In accordance with an embodiment, the first electronic device 102 may be configured to select certain images from the captured plurality of images taken at different viewing angles. In accordance with an embodiment, a set of selected images from the captured plurality of images may represent best shots as compared to others of the candidate images. The set of the selected images may be referred to as a learned image set. The set of the selected images may represent a high accuracy of intrinsic calibration results, as compared to others of the candidate images. The initial capture of the plurality of images and the preparation of the set of the selected images (or the learned image set) may be a one-time activity.

In operation, the first electronic device 102, or a new imaging device that is to be calibrated, may be placed at a fixed position so that during calibration the first electronic device 102 or the new electronic device may not need to be moved. In accordance with an embodiment, the first electronic device 102 may be configured to receive its position information. The position information of the first electronic device 102 may be used to estimate the required angle at which the first electronic device 102 needs to be in order to capture a plurality of images of the 3-D calibration object 106, for the calibration of the intrinsic and/or the extrinsic camera parameters.

In accordance with an embodiment, the first electronic device 102 may be configured to determine a rotation pattern of the 3-D calibration object 106. The rotation pattern may be determined based on a set of pre-selected images that includes the pre-defined 2-D texture pattern captured at pre-defined viewing angles. The set of pre-selected images may correspond to the learned image set (as described above).

In accordance with an embodiment, the first electronic device 102 may be configured to communicate control information to the second electronic device 104, associated with the 3-D calibration object 106. Based on the control information received from the first electronic device 102, the second electronic device 104 may rotate the 3-D calibration object 106, in accordance with the determined rotation pattern. The control information may correspond to the determined rotation pattern. The 3-D calibration object 106 may be rotated on horizontal and vertical axes, based upon receipt of the communicated control information.

In accordance with an embodiment, the first electronic device 102 may be configured to capture a video or a plurality of image frames of the 3-D calibration object 106, in accordance with the determined rotation pattern. In accordance with an embodiment, the rotation of the 3-D calibration object 106 by the second electronic device 104, may be intermittent and not continuous, such that the first electronic device 102 may have a clear shot of the façades of the 3-D calibration object 106.

In accordance with an embodiment, each façade of the 3-D calibration object 106 may have a detectable 2-D texture pattern that may be a homogenous or a heterogeneous texture pattern. The texture pattern may indicate a plurality of feature points. Further, in addition to the texture pattern, each façade may also include a unique identifier at a pre-defined position of the façade. For instance, the unique identifier may be a colored mark or other unique mark positioned at a specific region of each façade. The unique identifier may be positioned such that the detection of the plurality of feature points on each façade during image processing is not affected.

In accordance with an embodiment, the first electronic device 102 may be configured to detect a plurality of feature points in each of the captured plurality of image frames. The plurality of feature points may correspond to the 2-D texture pattern and/or the unique identifier on at least one façade of the 3-D calibration object 106. For instance, in a chessboard pattern, corners of the chessboard pattern in each façade may correspond to the plurality of feature points that may be detected (FIG. 3B). Notwithstanding, other known two-dimensional (2-D) patterns, such as circle patterns (FIG. 1B), symmetric, or asymmetric patterns, may be used for easy detection of the plurality of feature points.

In accordance with an embodiment, the first electronic device 102 may be configured to match the distribution of the plurality of feature points between an image frame of the captured plurality of image frames and an image of the set of pre-selected images. A similarity related to distribution of plurality of feature points may be determined between an image frame of the captured plurality of image frames and an image of the set of pre-selected images.

In accordance with an embodiment, the first electronic device 102 may be configured to select certain image frames from the captured plurality of image frames, based on the determined similarity for calibration of intrinsic camera parameters of the first electronic device 102. The selected image frames may be referred to as a first set of image frames from the captured plurality of image frames for intrinsic calibration. The first set of image frames may be utilized for the estimation of the intrinsic camera parameters of the first electronic device 102.

In accordance with an embodiment, the first electronic device 102 may be configured to determine another rotation pattern customized for estimation of extrinsic camera parameters. The second electronic device 104 may be configured to rotate the 3-D calibration object 106 around its vertical axis at a pre-defined step angle. The rotation may be programmed and intermittent. The rotation may occur based on a receipt of other control information received from the first electronic device 102. The other control information may correspond to the determined other rotation pattern.

In accordance with an embodiment, the first electronic device 102 may be configured to further capture another plurality of images or another video of the 3-D calibration object 106, at different rotation states. The 3-D real-world coordinates of all the feature points (and/or the unique identifier) on the 3-D calibration object 106 may be known at all times throughout the rotation of the 3-D calibration object 106. Accordingly, the time-of-capture of the plurality of image frames of the 3-D calibration object 106 may be synchronized to various rotation states of the 3-D calibration object 106. Such synchronization may be time-based synchronization based on the determined other rotation pattern. As an orientation of the façade of the 3-D calibration object 106 for a time instant in the determined other rotation pattern becomes known, a 2-D to 3-D mapping may be derived for an image frame captured at the time instant in the determined other rotation pattern.

The first electronic device 102 may be configured to determine the 2-D to 3-D mapping of each image frame of the captured other plurality of image frames for the calibration of extrinsic camera parameters for the first electronic device 102. Such 2-D to 3-D mapping may be based on the synchronization, the estimated intrinsic camera parameters, and/or the pre-stored 3-D world coordinates of the plurality of feature points on the 3-D calibration object 106. In accordance with an embodiment, a single rotation pattern may be determined and executed that may include the rotation pattern for calibration of intrinsic camera parameters and the other rotation pattern for calibration of extrinsic camera parameters.

FIG. 1B is a block diagram that illustrates another network environment for camera calibration by use of a rotatable 3-D calibration object, in accordance with an embodiment of the disclosure. FIG. 1B is explained in conjunction with elements from FIG. 1A. With reference to FIG. 1B, there is shown an exemplary network environment 100B. The network environment 100B may include an apparatus 112 to rotate the 3-D calibration object 106, a plurality of imaging devices 114A to 114D, the communication network 108, and one or more users, such as the user 110. The apparatus 112 may include one or more motors 112A, a stand mechanism 112B, and a controller 112C. The 3-D calibration object 106 may include a pre-defined 2-D texture pattern 106A and a unique identifier 106B on one or more façades of the 3-D calibration object 106.

The apparatus 112 may be designed to provide a rotatable base to the 3-D calibration object 106. The apparatus 112 may correspond to the second electronic device 104. The one or more motors 112A may be one or more electromechanical devices that may convert control information to discrete mechanical movements to rotate the 3-D calibration object 106. The control information may be received from the controller 112C or from the first electronic device 102. Examples of the one or more motors 112A may include, but are not limited to, a stepper motor and a servo motor. In accordance with an embodiment, the one or more motors 112A may be powered by one or more batteries (not shown). The apparatus 112 may further include the stand mechanism 112B, which may be a structure that may support the 3-D calibration object 106, and maintain stability during the 3-axes rotation of the 3-D calibration object 106. For instance, the stand mechanism 112B may be a tripod or a four-legged stand structure.

The apparatus 112 may further include the controller 112C. The controller 112C may be implemented based on a number of processor technologies known in the art. In accordance with an embodiment, the controller 112C may comprise suitable logic, circuitry, interfaces, and/or code that may be configured to receive control information from the first electronic device 102, by use of a network interface (not shown). The network interface may communicate with one or more electronic devices, such as the first electronic device 102, via the communication network 108. The network interface may communicate under the control of the controller 112C. In accordance with an embodiment, the controller 112C may be configured to execute a set of pre-stored instructions to rotate the 3-D calibration object 106. Examples of the controller 112C may include, but are not limited to, a microcontroller, a programmable controller station, a Reduced Instruction Set Computing (RISC) processor, an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, a microprocessor, and/or other processors or control circuits.

The plurality of imaging devices 114A to 114D may comprise suitable logic, circuitry, interfaces, and/or code that may be configured to capture a plurality of image frames or video of the 3-D calibration object 106. The plurality of imaging devices 114A to 114D may be configured to communicate with the first electronic device 102. Each of the plurality of imaging devices 114A to 114D may be configured to receive instructions from the first electronic device 102. Based on the received instructions, the capture of the plurality of image frames or video of the 3-D calibration object 106 may be initiated or stopped at various rotation states of the 3-D calibration object 106.

The 3-D calibration object 106 may include the pre-defined 2-D texture pattern 106A and the unique identifier 106B on one or more façades. An example of the 3-D calibration object 106 is shown in the FIG. 1B, where the 3-D calibration object 106 is a cube that includes four vertical façades with the 2-D texture pattern 106A and the unique identifier 106B. The other two façades are devoid of the pre-defined 2-D texture pattern 106A. The 2-D texture pattern 106A may be homogenous or heterogeneous pattern. In this case, the 2-D texture pattern 106A may be a 2-D symmetric circle pattern, as shown. Further, in addition to the pre-defined 2-D texture pattern 106A, each façade (such as the four vertical façades) may also include the unique identifier 106B at a pre-defined position of the façade. For instance, the unique identifier 106B may be a colored mark or other unique mark or pattern positioned at a unique region of each façade.

In an implementation, the first electronic device 102 may be a computing device communicatively coupled to the plurality of imaging devices 114A to 114D. Each of the plurality of imaging devices 114A to 114D may be placed at a fixed position so that during calibration of the plurality of imaging devices 114A to 114D, the plurality of imaging devices 114A to 114D may not need to be moved.

Conventional intrinsic camera parameter calibrations may require the camera or a calibration object to be moved in order to capture several (such as 10-100) images for calibration, and thus it may be a time-consuming process. Further, the time required to calibrate a camera may be proportional to the number of cameras to be calibrated as conventional intrinsic camera parameters calibration may involve manual capture of several images, and computation of the intrinsic parameters by each camera in turns. Thus, it may be advantageous to have fully-automated intrinsic and/or extrinsic camera parameters calibration, as described.

In operation, the first electronic device 102 may be configured to receive position information of the plurality of imaging devices 114A to 114D. The position information may be used to estimate the required angles at which each of the plurality of imaging devices 114A to 114D needs to be in order to capture a plurality of image frames of the 3-D calibration object 106, for the calibration of the intrinsic and/or the extrinsic camera parameters.

In accordance with an embodiment, the first electronic device 102 may be configured to determine a rotation pattern of the 3-D calibration object 106. The rotation pattern may be determined based on a set of pre-selected images (such as the set of selected images as described in FIG. 1A). Each image of the set of pre-selected images may include the pre-defined 2-D texture pattern 106A, captured at pre-defined viewing angles. The rotation pattern may be designed to generate one or more rotation sequences, such that each of the plurality of imaging devices 114A to 114D may capture a plurality of image frames of the 3-D calibration object 106 for intrinsic calibration.

In accordance with an embodiment, the rotation pattern may be 3-axes rotation designed such that the captured plurality of image frames by each of the plurality of imaging devices 114A to 114D may be representative of one or more images of the set of pre-selected images. The captured plurality of image frames by each of the plurality of imaging devices 114A to 114D may be a sample set of images. The set of pre-selected images may correspond to the learned image set. The use of the learned image set may be efficient. As long as sufficient sample images are collected that match the learned image set, the capture and further processing of the captured plurality of image frames or video may be stopped. Thus, capture of a large number of image frames or videos for the calibration may not be required.

In accordance with an embodiment, one or more rotation sequences for intrinsic calibration may be designed by use of the following mathematical expression:

$$0 \le n_{in} \le 360/(\theta_{in}° \times P) \quad (1)$$

where "$n_{in}$" may be a numeric value used for intrinsic calibration, "P" may be the number of façades of the 3-D calibration object 106 with pre-defined 2-D texture pattern 106A and/or a unique identifier 106B, and "$\theta_{in}$" may be a pre-defined step angle used for intrinsic parameter calibration. The rotation sequence may repeat at a certain degree along the vertical axis, given by the mathematical expression:

$$(n_{in} \times \theta_{in} +) \quad (2).$$

In accordance with an embodiment, the smaller the pre-defined step angle ($\theta°$), the better sample images may be captured to match with the learned image set.

In accordance with the mathematical expressions (1) and (2), when "$n_{in}$"="0", a 3-axes rotation configuration may be designed for a first image of the set of pre-selected images. In instances when all the possible rotation configurations for the first image of the set of pre-selected images are generated, the numeric value "$n_{in}$" may be increased by a value "1" (that is "$n_{in}=n_{in}+1$"). In instances, when "$n_{in}$">"360/($\theta_{in}° \times P$)", then the rotation may stop. In instances, when "$n_{in}$"≤"360/($\theta_{in}° \times P$)", then the 3-D calibration object 106 may be rotated along the vertical axis clockwise by the pre-defined step angle ($\theta_{in}°$). Similarly, a 3-axes rotation may be designed for a next image of the set of pre-selected images, until a complete rotation pattern is determined for all images of the set of pre-selected images for intrinsic camera parameters calibration. The 3-axes rotation may represent a horizontal and vertical rotation configuration. The rotation of the 3-D calibration object 106, in accordance with the determined rotation pattern that may include one or more rotation sequences, is further explained in FIG. 6.

In accordance with an embodiment, the first electronic device 102 may be configured to communicate control information to the network interface of the apparatus 112, via the communication network 108. The controller 112C may utilize the communicated control information to regulate the one or more motors 112A. The one or more motors 112A may generate mechanical movements to rotate the 3-D calibration object 106, in accordance with the determined rotation pattern. The 3-D calibration object 106 may be rotated on horizontal and vertical axes in a 3-axes rotation, based on the receipt of the communicated control information.

In accordance with an embodiment, the first electronic device 102 may further communicate instructions to the plurality of the imaging devices 114A to 114D to simultaneously capture a plurality of image frames of the 3-D calibration object 106, in accordance with the determined rotation pattern. In accordance with an embodiment, the plurality of the imaging devices 114A to 114D may capture videos of the 3-D calibration object 106 simultaneously. In accordance with an embodiment, the rotation of the 3-D calibration object 106, in accordance with the determined rotation pattern, may be intermittent and not continuous. The intermittent rotation may enable the plurality of the imaging devices 114A to 114D to have a clear shot of the façades of the 3-D calibration object 106 and to avoid motion blur in the captured image frames.

In accordance with an embodiment, for further processing, the first electronic device 102 may be configured to receive the captured plurality of image frames or the captured video from each of the plurality of imaging devices 114A to 114D. The captured plurality of image frames may include the 3-D calibration object 106. In accordance with an embodiment, each of the videos captured by the plurality of the imaging devices 114A to 114D may be processed in parallel by the same device, such as the first electronic device 102 (when implemented as the computing device). In accordance with an embodiment, each of the videos captured by the plurality of the imaging devices 114A to 114D may be processed by a separate device, such as a plurality of computing devices. Alternatively, each of the plurality of imaging devices 114A to 114D may process its own captured video or plurality of image frames simultaneously (when the first electronic device 102 is implemented as an imaging device, as described in FIG. 1A). Such processing may be performed for the simultaneous calibration of the intrinsic camera parameters of the plurality of imaging devices 114A to 114D.

In accordance with an embodiment, each façade of the 3-D calibration object 106 may have a detectable texture pattern that may be a homogenous or heterogeneous texture pattern. In this case, the pre-defined 2-D texture pattern 106A, such as homogenous circle pattern on the vertical facades of the 3-D calibration object 106, is shown in the FIG. 1B. In this case, the unique identifier 106B is positioned at a corner of each façade with the pre-defined 2-D texture pattern 106A of the 3-D calibration object 106, as shown in FIG. 1B. The unique identifier 106B may be positioned such that the detection of the plurality of feature points on each façade during image processing may not be affected.

In accordance with an embodiment, the first electronic device 102 may be configured to detect a plurality of feature points in each of the captured plurality of image frames. The plurality of feature points may correspond to the pre-defined 2-D texture pattern 106A and the unique identifier 106B. The detection of the plurality of feature points may be easier as conventional, flat 2-D texture patterns may be used on each façade of the 3-D calibration object 106. Notwithstanding, other known two-dimensional (2-D) patterns, such as chessboard pattern, blob patterns, symmetric or asymmetric patterns, may be used for simple detection of the plurality of feature points. In accordance with an embodiment, the plurality of feature points on each façade that may be the 2-D texture pattern 106A may be detected by use of known pattern-detection algorithms. Examples of such 2-D texture pattern-detection algorithms may include, but are not limited to, pattern detection algorithms of a "OpenCV" library, such as "findChess-boardCorners( )" function or "HoughCircles" function, a Bouguet MatLab Toolbox, and/or other known supervised or unsupervised algorithms for pattern detection as per the texture pattern used, in the field of camera calibration.

In accordance with an embodiment, the first electronic device 102 may be configured to determine a similarity of distribution of the plurality of feature points between each image frame of the captured plurality of image frames and an image of the set of pre-selected images. The first electronic device 102 may be configured to select the image frames from the captured plurality of image frames that have feature point distributions similar to one of the images in the set of pre-selected images. In instances, when all images in the set of pre-selected images match certain image frames from the captured plurality of image frames, the dynamic detection and selection process may stop. Thus, the use of the learned image set, such as the set of pre-selected images, may increase efficiency as it may not require capture of a large number of images or videos for intrinsic calibration.

In accordance with an embodiment, when all images in the set of pre-selected images are matched with certain image frames from the captured plurality of image frames, intrinsic camera parameters may be estimated for each of the plurality of imaging devices 114A to 114D. In accordance with an embodiment, one or more conventional intrinsic parameter estimation techniques may then be easily applied.

In accordance with an embodiment, the first electronic device 102 may be configured to determine another rotation pattern customized for extrinsic parameter calibration. The other rotation pattern determined for calibration of extrinsic camera parameters may be different from the rotation pattern determined for the calibration of intrinsic camera parameters. The 3-D calibration object 106 may be rotated around its vertical axis in the other rotation pattern which may be customized for the extrinsic parameter calibration.

In accordance with an embodiment, a rotation sequence for extrinsic parameters calibration may be designed by use of the following mathematical expression:

$$0 \le n_{ex} \le 360/(\theta_{ex}° \times P) \quad (3),$$

where, "$n_{ex}$" is an integer, "P" is the number of façades of the 3-D calibration object 106, and "$\theta_{ex}°$" is a pre-defined step angle for extrinsic parameters calibration. In accordance with an embodiment, the other pre-defined step angle "$\theta_{ex}°$" for extrinsic parameters calibration may be greater than the pre-defined step angle "$\theta_{in}°$" for intrinsic parameters calibration (that is, "$\theta_{ex}°$">"$\theta_{in}°$"). In accordance with an embodiment, the 3-D calibration object 106 may be rotated at all of the following degrees along the vertical axis, given by the mathematical expression:

$$n_{ex} \times \theta_{ex}° \quad (4).$$

In accordance with the mathematical expressions (3) and (4), when "$n_{ex}$"="0", at a first rotation state of the 3-D calibration object 106, the rotation may temporarily stop for a pre-defined duration, which may be referred to as the capturing period. In a first capturing period, the plurality of the imaging devices 114A to 114D may capture another plurality of images or video of the 3-D calibration object 106 in the rotation state of the 3-D calibration object 106. After the first capturing period, the value of the integer "$n_{ex}$" may be increased by a numeric value "1" (that is, "$n_{ex}$"="$n_{ex}$+1"). In instances when "$n_{ex}$">"360/($\theta_{ex}° \times P$)", the rotation may stop. In instances when "$n_{in}$"≤"360/($\theta_{ex}° \times P$)", the 3-D calibration object 106 may be rotated along the vertical axis clockwise by the other pre-defined step angle "$\theta_{ex}°$". Accordingly, the integer value may be then set to "n=1", at a second rotation state of the 3-D calibration object 106. Again, the rotation may temporarily stop for the pre-defined duration, which may be the second capturing period. The rotation of the 3-D calibration object 106, in accordance with the determined other rotation pattern that may include one or more rotation sequences for calibration of extrinsic camera parameters, is further explained in FIG. 7.

The controller 112C may be configured to generate a timestamp for each rotation state of the 3-D calibration object 106. Accordingly, the time-of-capture of the plurality of image frames, during the various capturing periods, by each of the plurality of the imaging devices 114A to 114D may be associated to the rotation state of the 3-D calibration object 106. In accordance with an embodiment, at each pre-defined step angle, the first electronic device 102 may be configured to synchronize time-of-capture of the plurality of image frames of the 3-D calibration object 106 with the rotation state of the 3-D calibration object 106. Such synchronization may be based on the association of the timestamps and/or the determined other rotation pattern.

The 3-D real-world coordinates of all the feature points and the unique identifier on the 3-D calibration object 106 are known at all times throughout the rotation of the 3-D calibration object 106. The orientation of a façade of the 3-D calibration object 106 for a time instance may be known in the determined other rotation pattern. Accordingly, a two-dimensional (2-D) to 3-D mapping for an image frame captured at the time instant in the determined rotation pattern may be derivable. The first electronic device 102 may be configured to determine the 2-D to 3-D mapping of each image frame of the captured other plurality of image frames for the calibration of extrinsic camera parameters for the plurality of the imaging devices 114A to 114D. Such 2-D to 3-D mapping may be based on the synchronization, the calibrated camera intrinsic parameters, and the 3-D world coordinates of the plurality of feature points on the 3-D calibration object 106. During the extrinsic calibration, the plurality of imaging devices 114A to 114D may capture multiple perspectives of the homogeneous 2-D pattern, which makes the resultant accuracy more uniform among different viewing angles.

Certain conventional camera extrinsic parameter estimations with calibration objects/pattern may use fixed 2-D texture patterns. In such cases, the positions of imaging devices may be restricted by viewing angles in which the imaging devices may discern the pattern. Such angles are usually less than "160 degrees" in front of the calibration pattern. The disclosed system and method for camera calibration, by use of the rotatable 3-D calibration object 106, does not impose any limitation of viewing angles. As a result, the plurality of imaging devices 114A to 114D may be positioned around the 3-D calibration object 106, where the pre-defined 2-D texture pattern 106A of the rotatable 3-D calibration object 106 may be discernible by the imaging devices 114A to 114D with viewing angles of full "360 degree".

In accordance with an embodiment, the plurality of feature points, which may include the unique identifier 106B, may be aggregated for each of the plurality of imaging devices 114A to 114D from the captured plurality of image frames for extrinsic camera parameter estimation. In accordance with an embodiment, the extrinsic camera parameters may be estimated for each of the plurality of the imaging devices 114A to 114D. In accordance with an embodiment, one or more conventional extrinsic camera parameter estimation techniques may be then easily applied based on the 2-D to 3-D mapping.

Figure 2:
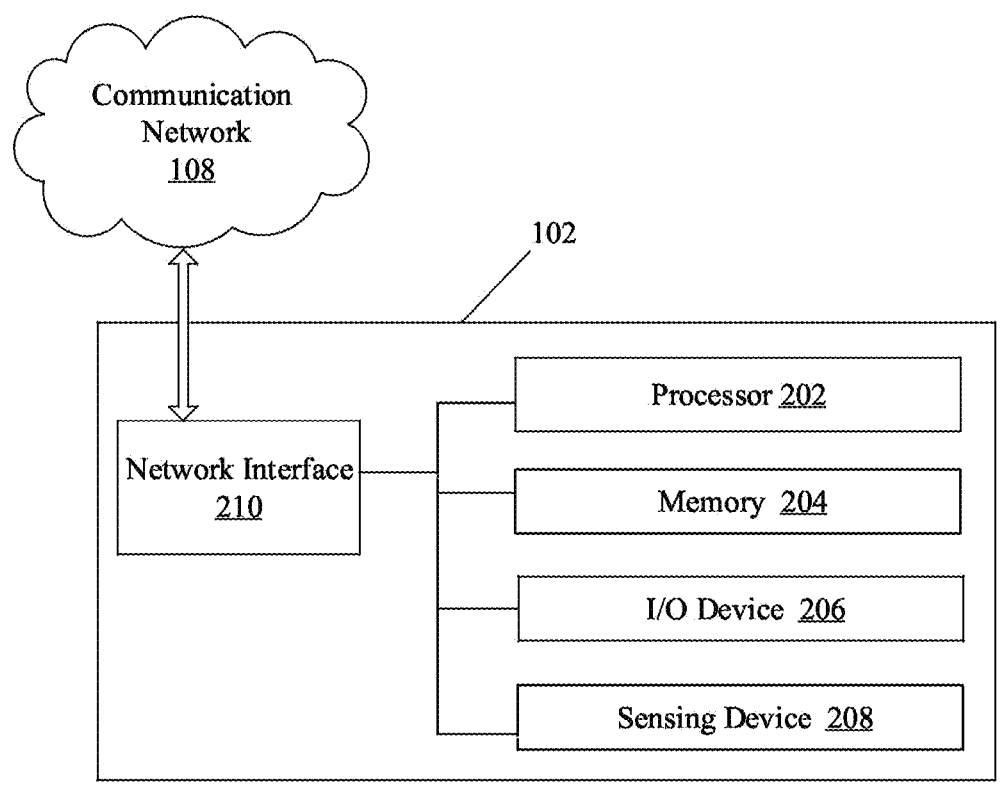
FIG. 2 illustrates a block diagram of an exemplary electronic device for camera calibration by use of a rotatable 3-D calibration object, in accordance with an embodiment of the disclosure.

FIG. 2 illustrates a block diagram of an exemplary electronic device for camera calibration by use of a rotatable 3-D calibration object, in accordance with an embodiment of the disclosure. FIG. 2 is explained in conjunction with elements from FIG. 1A and FIG. 1B. With reference to FIG. 2, there is shown the first electronic device 102. The first electronic device 102 may comprise one or more processors, such as a processor 202, a memory 204, one or more input/output (I/O) devices, such as an I/O device 206, a sensing device 208, and a network interface 210.

The processor 202 may be communicatively coupled to the memory 204, the I/O device 206, and the network interface 210. The network interface 210 may communicate with the second electronic device 104 (FIG. 1A), via the communication network 108, under the control of the processor 202. The network interface 210 may communicate with the network interface of the apparatus 112 (FIG. 1B), via the communication network 108, under the control of the processor 202.

The processor 202 may comprise suitable logic, circuitry, interfaces, and/or code that may be configured to execute a set of instructions stored in the memory 204. The processor 202 may be implemented based on a number of processor technologies known in the art. Examples of the processor 202 may be an X86-based processor, X86-64-based processor, a Reduced Instruction Set Computing (RISC) processor, an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The memory 204 may comprise suitable logic, circuitry, and/or interfaces that may be configured to store a machine code and/or a set of instructions executable by the processor 202. The memory 204 may be further configured to store operating systems and associated applications. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, interfaces, and/or code that may be configured to receive an input from the user 110. The I/O device 206 may be further configured to provide an output to the user 110. The I/O device 206 may comprise various input and output devices that may be operable to communicate with the processor 202. Examples of the input devices may include, but are not limited to, an image-capturing unit (not shown), a camcorder, a touch screen, a keyboard, a mouse, a joystick, a microphone, a motion sensor, a light sensor, and/or a docking station. Examples of the output devices may include, but are not limited to, a display screen, a projector screen, and/or a speaker.

The sensing device 208 may comprise suitable logic, circuitry, and/or interfaces that may be operable to store a machine code and/or a computer program with at least one code section executable by the processor 202. The sensing device 208 may further comprise one or more sensors to capture of the plurality of image frames and/or videos, by the image capturing unit. The one or more sensors may further include a microphone to detect a voice pattern, confirm recognition, identification, and/or verification of the user 110. Examples of the one or more sensors may include, but are not limited to, an image sensor, a global positioning system (GPS) sensor, a compass or magnometer, an ambient light sensor, a tricorder, a gyroscope, a proximity sensor, a lux meter, a touch sensor, an infrared sensor, and/or other sensors.

The network interface 210 may comprise suitable logic, circuitry, interfaces, and/or code that may be configured to communicate with the second electronic device 104, via the communication network 108 (as shown in FIG. 1A). The network interface 210 may implement known technologies to support wired or wireless communication of the first electronic device 102 with the communication network 108. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 210 may communicate via wired or wireless communication with the communication network 108. The wireless communication may use one or more of the communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Long-Term Evolution (LTE), Wireless Fidelity (Wi-Fi) (such as IEEE 802.11a, IEEE 802.11b, IEEE 802.11g and/or IEEE 802.11n), Light-Fidelity (Li-Fi), voice over Internet Protocol (VoIP), Wi-MAX, a protocol for email, instant messaging, and/or Short Message Service (SMS).

In operation, the processor 202 may be configured to determine a rotation pattern of the 3-D calibration object 106. The rotation pattern may be determined based on a set of pre-selected images. The set of pre-selected images may include a detectable 2-D texture pattern captured at predefined viewing angles. The set of pre-selected images may correspond to the learned image set. The determined rotation pattern may be stored as control information in the memory 204.

In accordance with an embodiment, the processor 202 may be configured to communicate control information to the second electronic device 104, by use of the network interface 210. In accordance with an embodiment, the second electronic device 104 may correspond to the apparatus 112. Based on the control information received from the processor 202, the second electronic device 104 may rotate the 3-D calibration object 106, in accordance with the determined rotation pattern. The control information may correspond to the determined rotation pattern. The 3-D calibration object 106 may be rotated on horizontal and vertical axes, based on the receipt of the communicated control information. In accordance with an embodiment, the functionalities or operations performed by the first electronic device 102, as described in FIGS. 1A and 1B, may performed by the processor 202. Other operations performed by the processor 202 may be understood from the description in the FIGS. 3A, 3B, 4A, 4B, 5A and 5B.

Figure 3A:
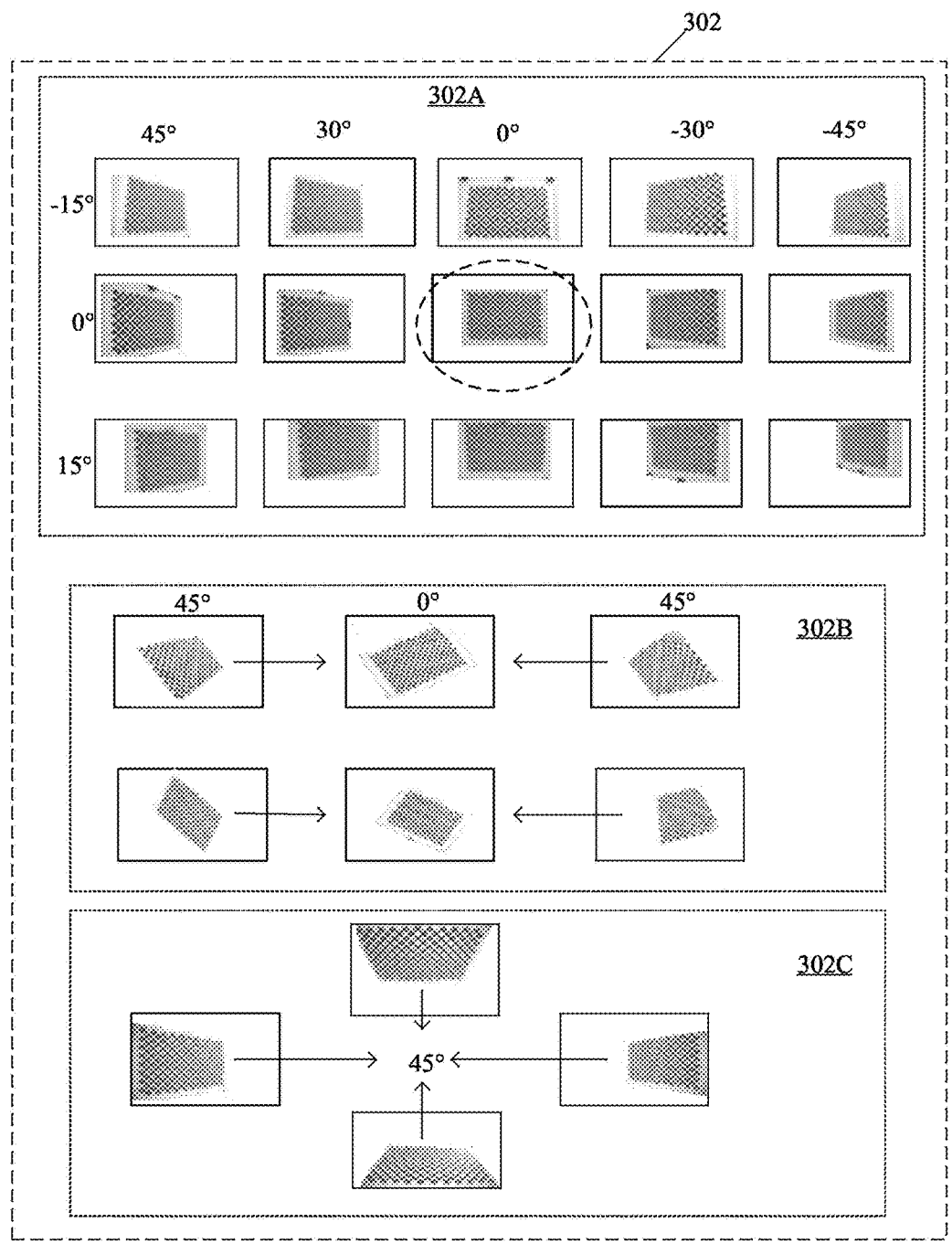
FIGS. 3A and 3B, collectively, illustrate an exemplary scenario for implementation of the disclosed system and method for camera calibration by use of a rotatable 3-D calibration object, in accordance with an embodiment of the disclosure.
Figure 3B:
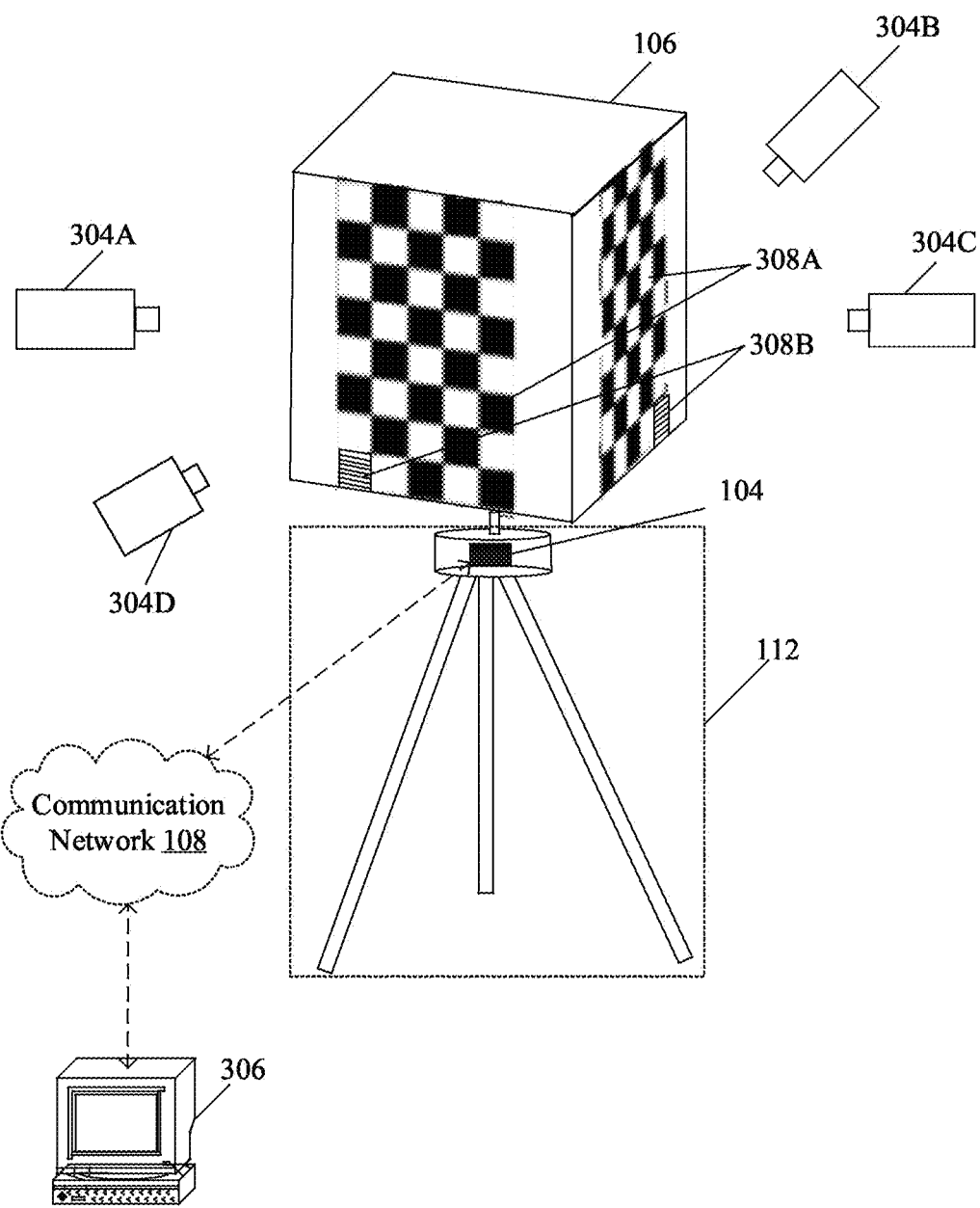

FIGS. 3A and 3B, collectively, illustrate an exemplary scenario for implementation of the disclosed system and method for camera calibration by use of a rotatable 3-D calibration object, in accordance with an embodiment of the disclosure. FIG. 3A is described in conjunction with FIGS. 1A, 1B, and 2. With reference to FIG. 3A, there is shown a set of candidate images 302 of a 2-D chessboard pattern, captured at different viewing angles. The set of candidate images 302 may include a first subset of images 302A, a second subset of images 302B, and a third subset of images 302C.

In accordance with the exemplary scenario, the set of candidate images 302 may correspond to the initial capture of the plurality of images of the 3-D calibration object 106, from which the learned set of images is selected (FIG. 1A). The first subset of images 302A may include views of a 2-D texture pattern, such as a chessboard texture pattern, in different orientation (or tilt) angles. The first subset of images 302A may be captured at "+45°", "+30°", "0°", "−30°", and "−45°" horizontal orientation tilt, and "−15°", "0°", "+15°" vertical orientation tilt that corresponds to the viewing angles (tilt angles) of a camera (not shown) with respect to the 2-D texture pattern. The camera may correspond to one of the plurality of imaging devices 114A to 114D. The second subset of images 302B may include views of the 2-D texture pattern rotated at different angles, as shown. The third subset of images 302C may include views of the 2-D texture pattern located at different border regions of the images, as shown.

In accordance with an embodiment, certain images for intrinsic calibration, such as a set of eleven images, may be selected from the set of candidate images 302. The set of eleven images that may be selected by a user, such as the user 110, may represent the best image set for intrinsic calibration. The selected set of eleven images may be referred to as a learned image set. The selected set of eleven images may include an image (shown encircled by a dashed ellipse) from the first subset of images 302A. The selected set of eleven images may further include all six images from the second subset of images 302B. The selected set of eleven images may further include all four images from the third subset of images 302C.

With reference to FIG. 3B, there is shown a plurality of cameras 304A to 304D, a computing device 306, a 2-D chessboard pattern 308A, a colored unique identifier 308B, the 3-D calibration object 106, the second electronic device 104, and the apparatus 112. In accordance with the first exemplary scenario, the plurality of cameras 304A to 304D may correspond to the plurality of imaging devices 114A to 114D (FIG. 1B). The computing device 306 may correspond to the first electronic device 102 (FIG. 1B). Further, the 2-D chessboard pattern 308A and the colored unique identifier 308B may correspond to the 2-D texture pattern 106A (FIG. 1B) and the unique identifier 106B (FIG. 1B), respectively. The second electronic device 104 may include the network interface and the controller 112C (FIG. 1B).

In accordance with an embodiment, the computing device 306 may be configured to dynamically select certain images from the set of candidate images 302. The selected set of images may represent a high accuracy of intrinsic calibration results as compared to other images of the set of candidate images 302. In accordance with an embodiment, the selection may be based on a quality threshold associated with detection of the plurality of feature points in the set of candidate images 302. The selected set of images may correspond to a learned set of images.

In accordance with the exemplary scenario, the plurality of cameras 304A to 304D may be newly manufactured cameras that require calibration of intrinsic and extrinsic camera parameters. In another example, the plurality of cameras 304A to 304D may need to be installed at a sports field to record a professional sports event. Thus, the plurality of cameras 304A to 304D may require uniform intrinsic and extrinsic camera parameter calibrations to be able to produce uniform results for the professional sports event recording.

In accordance with an embodiment, the computing device 306 may be configured to determine a rotation pattern of the 3-D calibration object 106, for calibration of intrinsic camera parameters of the plurality of cameras 304A to 304D. The rotation pattern may be determined based on the set of selected images. The 3-D calibration object 106 may be rotatable and may include four vertical façades with the same 2-D chessboard pattern 308A and the colored unique identifier 308B. The plurality of cameras 304A to 304D may be positioned around the 3-D calibration object 106. The 2-D chessboard pattern 308A of the rotatable 3-D calibration object 106 may be discernible by the plurality of cameras 304A to 304D, with viewing angles of full 360 degrees. As four façades are utilized, the 3-D calibration object 106 may not be required to be rotated to full "360 degrees". A "90 degree" rotation of the 3-D calibration object 106 may have a similar effect of "360 degree" coverage to generate various viewing angles for the plurality of cameras 304A to 304D.

In accordance with an embodiment, the computing device 306 may be configured to communicate control information to the second electronic device 104 to rotate the 3-D calibration object 106, in accordance with the determined rotation pattern in a 3-axes rotation. The control information may be communicated via the communication network 108, such as in a wireless communication. The computing device 306 may be configured to communicate control instructions to the plurality of the cameras 304A to 304D to capture a plurality of image frames of the 3-D calibration object 106 during various rotation states of the 3-D calibration object 106.

In accordance with an embodiment, each of the plurality of the cameras 304A to 304D may capture a plurality of image frames of the 3-D calibration object 106 simultaneously. The computing device 306 may be configured to receive the captured plurality of image frames from each of the plurality of the cameras 304A to 304D.

In accordance with an embodiment, the computing device 306 may be configured to detect a plurality of feature points in each of the captured plurality of image frames of each of the plurality of the cameras 304A to 304D. The computing device 306 may determine a similarity of the distribution of the plurality of feature points between each image frame of the captured plurality of image frames and an image of the set of selected images. In this case, the corners of the 2-D chessboard pattern 308A in each façade and/or the colored unique identifier 308B may be the plurality of feature points that may be detected.

In accordance with an embodiment, the computing device 306 may be configured to select the image frames from the captured plurality of image frames that have feature point distributions similar to one of the images in the set of selected images. In instances when the all images in the set of pre-selected images are matched with certain image frames from the captured plurality of image frames, the dynamic detection and selection process may stop. Thus, the use of the learned image set, such as the set of selected images, may increase efficiency as it may not require capture of a large number of images or videos for intrinsic calibration. The intrinsic camera parameters may then be estimated for each of the plurality of cameras 304A to 304D, based on the selected image frames from the captured plurality of image frames. In accordance with an embodiment, one or more known intrinsic parameter estimation techniques may then be applied.

In accordance with an embodiment, the computing device 306 may be configured to determine a different rotation pattern customized for calibration of extrinsic camera parameters, such as rotation and translation parameters. The rotation may be designed to generate as many 3-D points as possible by use of the colored unique identifiers 308B and/or an edge that result from an intersection between the two façades with the 2-D chessboard pattern 308A. It may be desirable that the colored unique identifiers 308B on each façade are as distantly distributed as possible on the 3D-calibration object 106, such that a larger 3-D space is covered by the colored unique identifiers 308B (such as the 3-D points). This may result in higher accuracy when the colored unique identifiers 308B and/or the edges are detected in the image frames of videos that may be captured by each of the plurality of cameras 304A to 304D. A 2-D to 3-D mapping for calibration of extrinsic camera parameters may be performed.

In accordance with an embodiment, the computing device 306 may be configured to synchronize time-of-capture of the plurality of image frames of the 3-D calibration object 106 with the rotation state of the 3-D calibration object 106 at each pre-defined step angle, such as the "$\theta_{ex}°$". As an orientation of each façade of the 3-D calibration object 106 for a time instant in the determined other rotation pattern may be known, a 2-D to 3-D mapping for an image frame captured at the time instant in the determined rotation pattern may be derivable. The first electronic device 102 may be configured to determine a 2-D to 3-D mapping of each image frame of the captured other plurality of image frames for the calibration of extrinsic camera parameters for the plurality of the cameras 304A to 304D. Such 2-D to 3-D mapping may be based on the time-of-capture synchronization, the calibrated camera intrinsic parameters, and the 3-D world coordinates of the plurality of feature points on the 3-D calibration object 106. During the extrinsic calibration, the plurality of cameras 304A to 304D may capture multiple perspectives of the homogeneous 2-D texture pattern 106A, which makes the resultant accuracy more uniform among different viewing angles. Thus, the computing device 306 may perform quick and automated calibration of intrinsic and/or extrinsic parameters of the plurality of cameras 304A to 304D with the same rotatable 3-D calibration object 106 with increased accuracy.

Figure 4A:
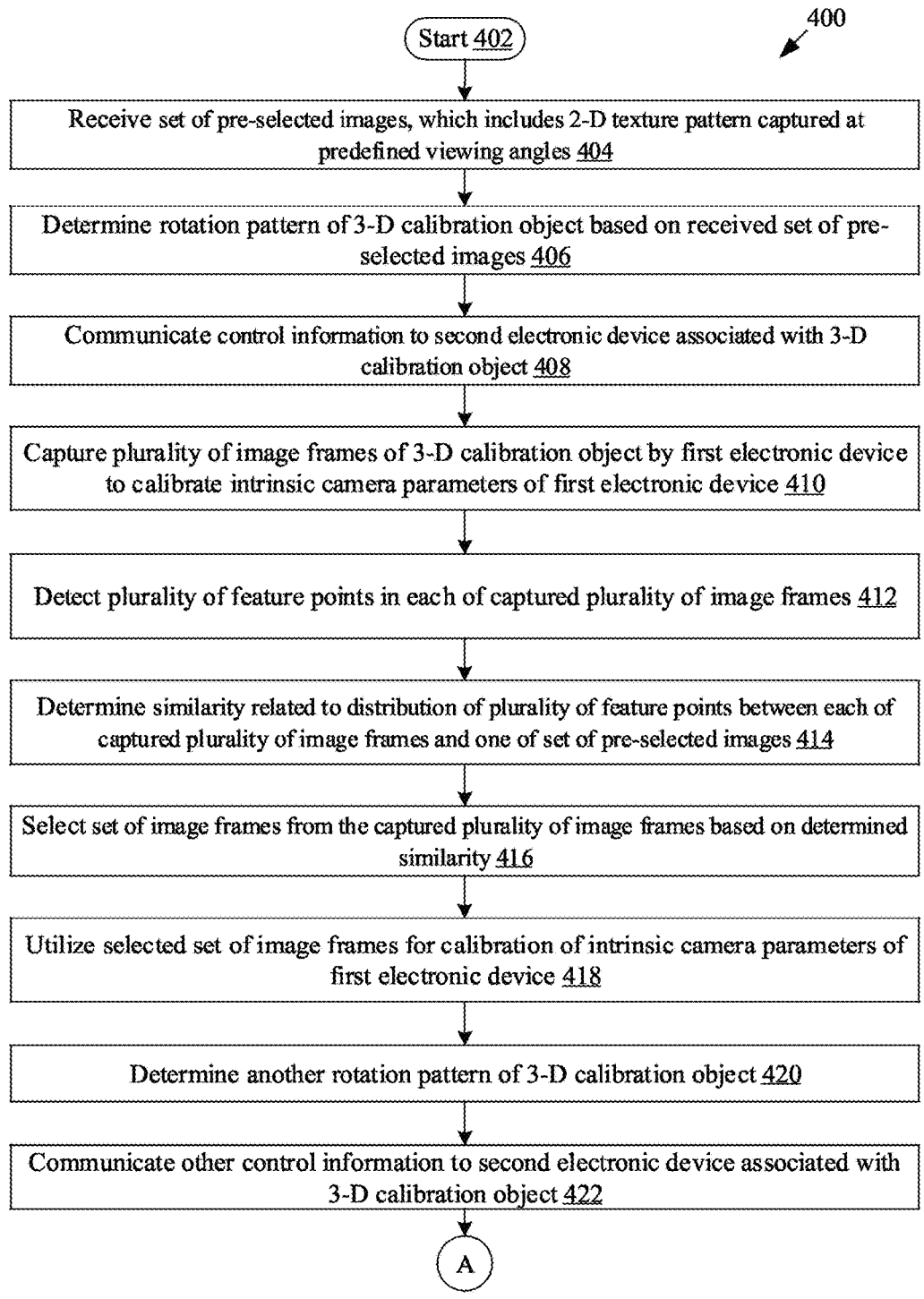
FIGS. 4A and 4B, collectively, illustrate a first flow chart for implementation of an exemplary method for camera calibration by use of a rotatable 3-D calibration object, in accordance with an embodiment of the disclosure.
Figure 4B:
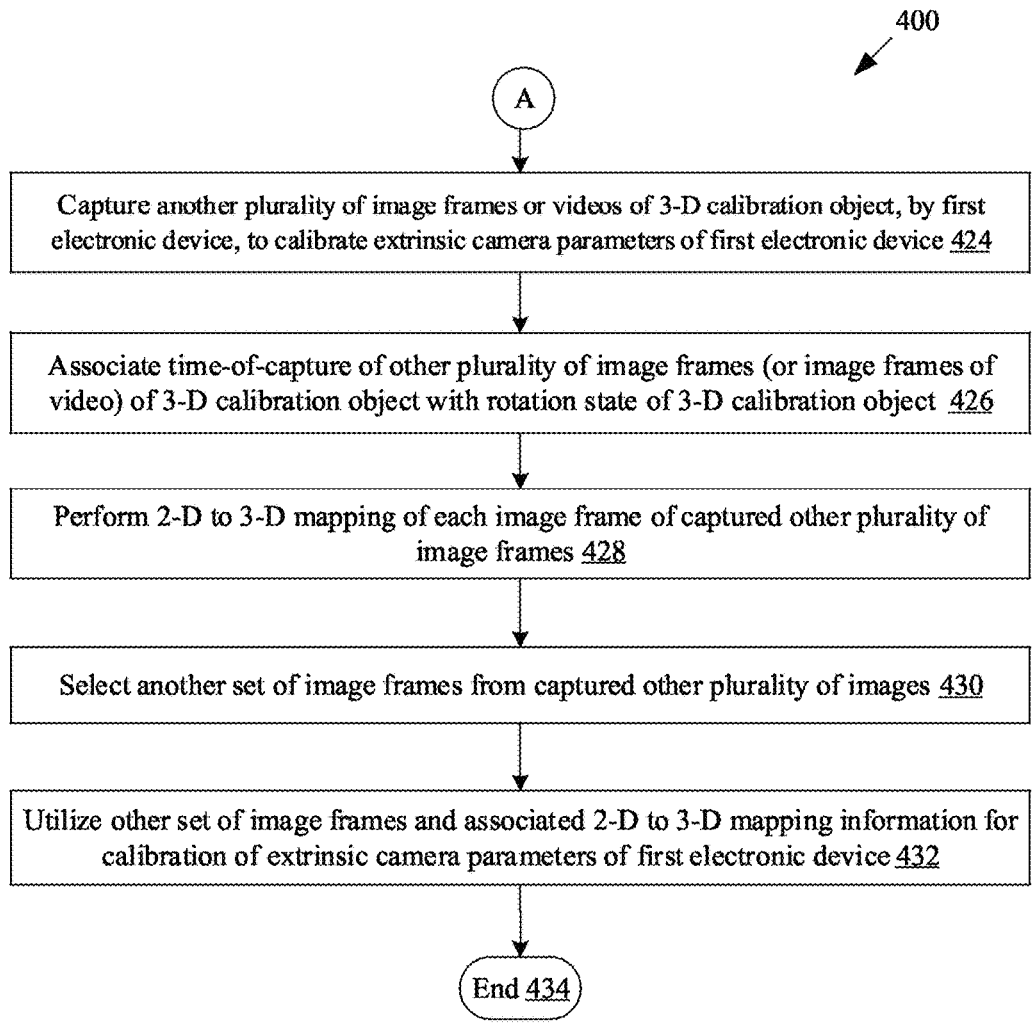

FIGS. 4A and 4B, collectively, illustrates a first flow chart for implementation of an exemplary method for camera calibration by use of a rotatable 3-D calibration object, in accordance with an embodiment of the disclosure. With reference to FIGS. 4A and 4B, there is shown a flow chart 400. The flow chart 400 is described in conjunction with FIGS. 1A, 1B, 2, 3A and 3B. The method, in accordance with the flow chart 400, may be implemented in the first electronic device 102. The method starts at step 402 and proceeds to step 404.

At step 404, a set of pre-selected images, which includes a 2-D texture pattern captured at pre-defined viewing angles, may be received. The set of pre-selected images may correspond to the learned image set. At step 406, a rotation pattern of the 3-D calibration object 106 may be determined. The rotation pattern may be determined based on the set of pre-selected images that includes the 2-D texture pattern captured at pre-defined viewing angles.

At step 408, control information may be communicated to the second electronic device 104, associated with the 3-D calibration object 106. The control information may correspond to the determined rotation pattern. The control information may be communicated to rotate the 3-D calibration object 106, in accordance with the determined rotation pattern. At step 410, a plurality of image frames of the 3-D calibration object 106 may be captured by the first electronic device 102, to calibrate intrinsic camera parameters of the first electronic device 102.

At step 412, a plurality of feature points may be detected in each of the captured plurality of image frames. The plurality of feature points may correspond to the pre-defined 2-D texture pattern 106A, and/or the unique identifier 106B, in each of the captured plurality of image frames. An example of the plurality of feature points may be the corners of the 2-D chessboard pattern, as shown in FIG. 3B. At step 414, a similarity related to distribution of the plurality of feature points between each of the captured plurality of image frames and one of the set of pre-selected images, may be determined.

At step 416, a set of image frames from the captured plurality of images may be selected based on the determined similarity. At step 418, the set of image frames may be utilized for calibration of intrinsic camera parameters of the first electronic device 102. At step 420, another rotation pattern of the 3-D calibration object may be determined. The other rotation pattern may be determined for calibration of extrinsic camera parameters for the first electronic device 102.

At step 422, other control information may be communicated to the second electronic device 104, associated with the 3-D calibration object 106. The other control information may correspond to the determined other rotation pattern for the extrinsic calibration. At step 424, another plurality of image frames or videos of the 3-D calibration object 106 may be captured by the first electronic device 102, to calibrate extrinsic camera parameters of the first electronic device 102. A time-of-capture of the other plurality of image frames of the 3-D calibration object 106 may be synchronized to a rotation state of the 3-D calibration object 106 at a specific angle based on the determined other rotation pattern.

At step 426, the time-of-capture of the other plurality of image frames (or the image frames of the video) of the 3-D calibration object 106 may be associated with a rotation state of the 3-D calibration object 106. At step 428, a 2-D to 3-D mapping of each image frame of the captured other plurality of image frames may be performed. The 2-D to 3-D mapping may be based on the time-of-capture synchronization, the estimated camera intrinsic parameters, and pre-stored 3-D world coordinates of the plurality of feature points that includes the unique identifiers 106B on the 3-D calibration object 106. The orientation of each façade of the 3-D calibration object 106 for a time instant in the determined other rotation pattern may be known. Accordingly, the 2-D to 3-D mapping for an image frame captured at a particular time instant in the determined rotation pattern may be derivable.

At step 430, another set of image frames from the captured other plurality of images may be selected based on the 2-D to 3-D mapping. At step 432, the other set of image frames and the associated 2-D to 3-D mapping information may be utilized for calibration of extrinsic camera parameters of the first electronic device 102. The control may pass to the end step 434.

Figure 5A:
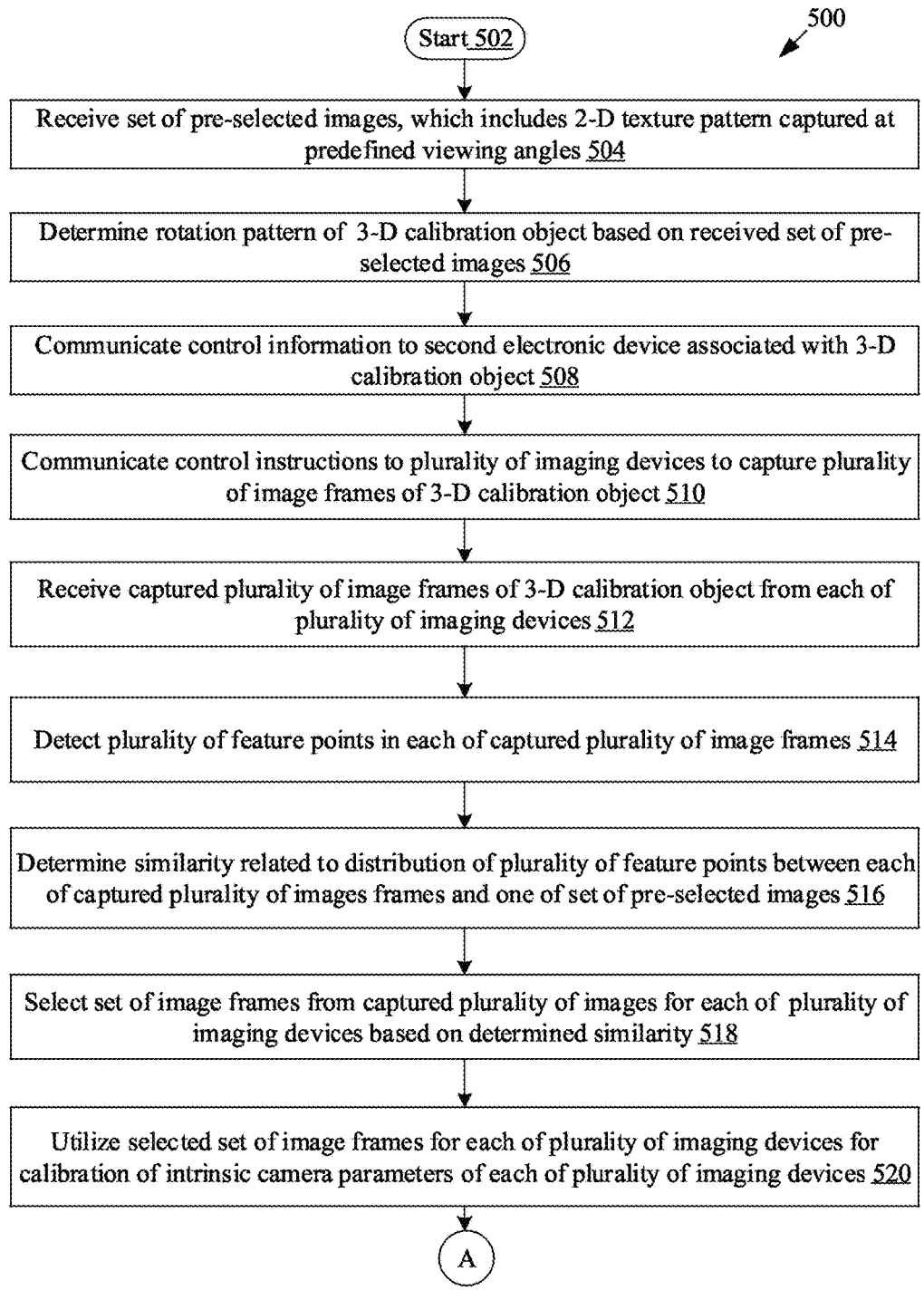
FIGS. 5A and 5B, collectively, illustrate a second flow chart for implementation of an exemplary method for camera calibration by use of a rotatable 3-D calibration object, in accordance with an embodiment of the disclosure.
Figure 5B:
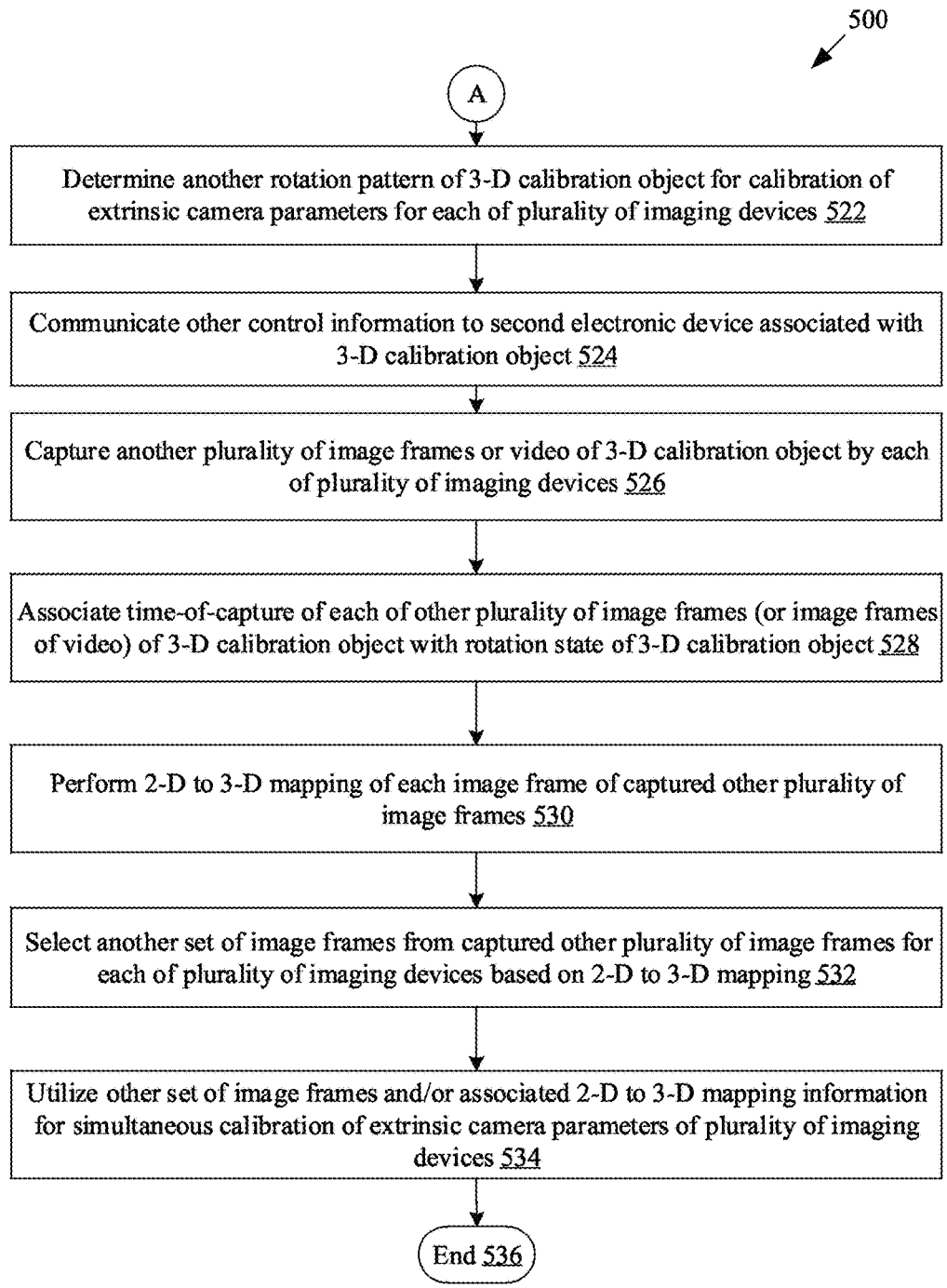

FIGS. 5A and 5B, collectively, illustrate a second flow chart for implementation of an exemplary method for camera calibration by use of a rotatable 3-D calibration object, in accordance with an embodiment of the disclosure. With reference to FIGS. 5A and 5B, there is shown a flow chart 500. The flow chart 500 is described in conjunction with FIGS. 1A, 1B, 2, 3A, and 3B. The method, in accordance with the flow chart 500, may be implemented in the first electronic device 102. The first electronic device 102 may be a computing device, such as the computing device 306, which may be communicatively coupled to the plurality of imaging devices 114A to 114D. The method starts at step 502 and proceeds to step 504.

At step 504, a set of pre-selected images, which includes a 2-D texture pattern captured at pre-defined viewing angles, may be received. The set of pre-selected images may correspond to the learned image set. At step 506, a rotation pattern of the 3-D calibration object 106 may be determined. The rotation pattern may be determined based on the set of pre-selected images, which includes the 2-D texture pattern captured at pre-defined viewing angles.

At step 508, control information may be communicated to the second electronic device 104, associated with the 3-D calibration object 106. The control information may correspond to the determined rotation pattern. The control information may be communicated to rotate the 3-D calibration object 106, in accordance with the determined rotation pattern. At step 510, control instructions may be communicated to the plurality of imaging devices 114A to 114D, to capture a plurality of image frames of the 3-D calibration object 106 during various rotation states of the 3-D calibration object 106, in accordance with the determined rotation pattern. An example of the plurality of imaging devices 114A to 114D may be the plurality of cameras 304A to 304D. A plurality of image frames may be captured by each of the plurality of imaging devices 114A to 114D for parallel computation of intrinsic camera parameters of the plurality of imaging devices 114A to 114D. The plurality of imaging devices 114A to 114D may be positioned around the 3-D calibration object 106, at a height similar to that of the 3-D calibration object 106.

At step 512, the captured plurality of image frames of the 3-D calibration object 106 may be received from each of the plurality of imaging devices 114A to 114D. At step 514, a plurality of feature points may be detected in each of the captured plurality of image frames. The plurality of feature points may correspond to the pre-defined 2-D texture pattern 106A and/or the unique identifier 106B in each of the captured plurality of image frames.

At step 516, a similarity related to distribution of the plurality of feature points between each of the captured plurality of image frames and one of the set of pre-selected images, may be determined. At step 518, a set of image frames from the captured plurality of images for each of the plurality of imaging devices 114A to 114D, may be selected based on the determined similarity.

At step 520, the selected set of image frames for each of the plurality of imaging devices 114A to 114D, may be utilized for calibration of intrinsic camera parameters of each of the plurality of imaging devices 114A to 114D, simultaneously. At step 522, another rotation pattern of the 3-D calibration object 106 may be determined. The other rotation pattern may be determined for calibration of extrinsic camera parameters for each of the plurality of imaging devices 114A to 114D.

At step 524, other control information may be communicated to the second electronic device 104, associated with the 3-D calibration object 106. The control information may correspond to the determined other rotation pattern for the extrinsic calibration. At step 526, another plurality of image frames, or a video of the 3-D calibration object 106, may be captured by each of the plurality of imaging devices 114A to 114D. The other plurality of image frames or the video may be captured during the various capturing periods (described in FIG. 1B and further in FIG. 7) to calibrate extrinsic camera parameters of the plurality of imaging devices 114A to 114D. A time-of-capture of the other plurality of image frames (or image frames of the captured video) of the 3-D calibration object 106 may be synchronized to each rotation state of the 3-D calibration object 106, at a specific angle based on the determined other rotation pattern.

At step 528, the time-of-capture of each of the other plurality of image frames (or the image frames of the video) of the 3-D calibration object 106 may be associated with a rotation state of the 3-D calibration object 106. At step 530, a 2-D to 3-D mapping of each image frame of the captured other plurality of image frames may be performed. The 2-D to 3-D mapping may be based on the synchronization of the time-of-capture, the estimated camera intrinsic parameters, and pre-stored 3-D world coordinates of the plurality of feature points that includes the unique identifiers 106B on the 3-D calibration object 106. The orientation of each façade of the 3-D calibration object 106 for a time instant may be known based on the determined other rotation pattern. Accordingly, the 2-D to 3-D mapping for an image frame captured at a particular time instant in the determined other rotation pattern may be derivable.

At step 532, another set of image frames from the captured other plurality of image frames for each of the plurality of imaging devices 114A to 114D, may be selected based on the 2-D to 3-D mapping. At step 534, the other set of image frames and/or the associated 2-D to 3-D mapping information may be utilized for simultaneous calibration of extrinsic camera parameters of the plurality of imaging devices 114A to 114D. The control may pass to the end step 536.

Figure 6:
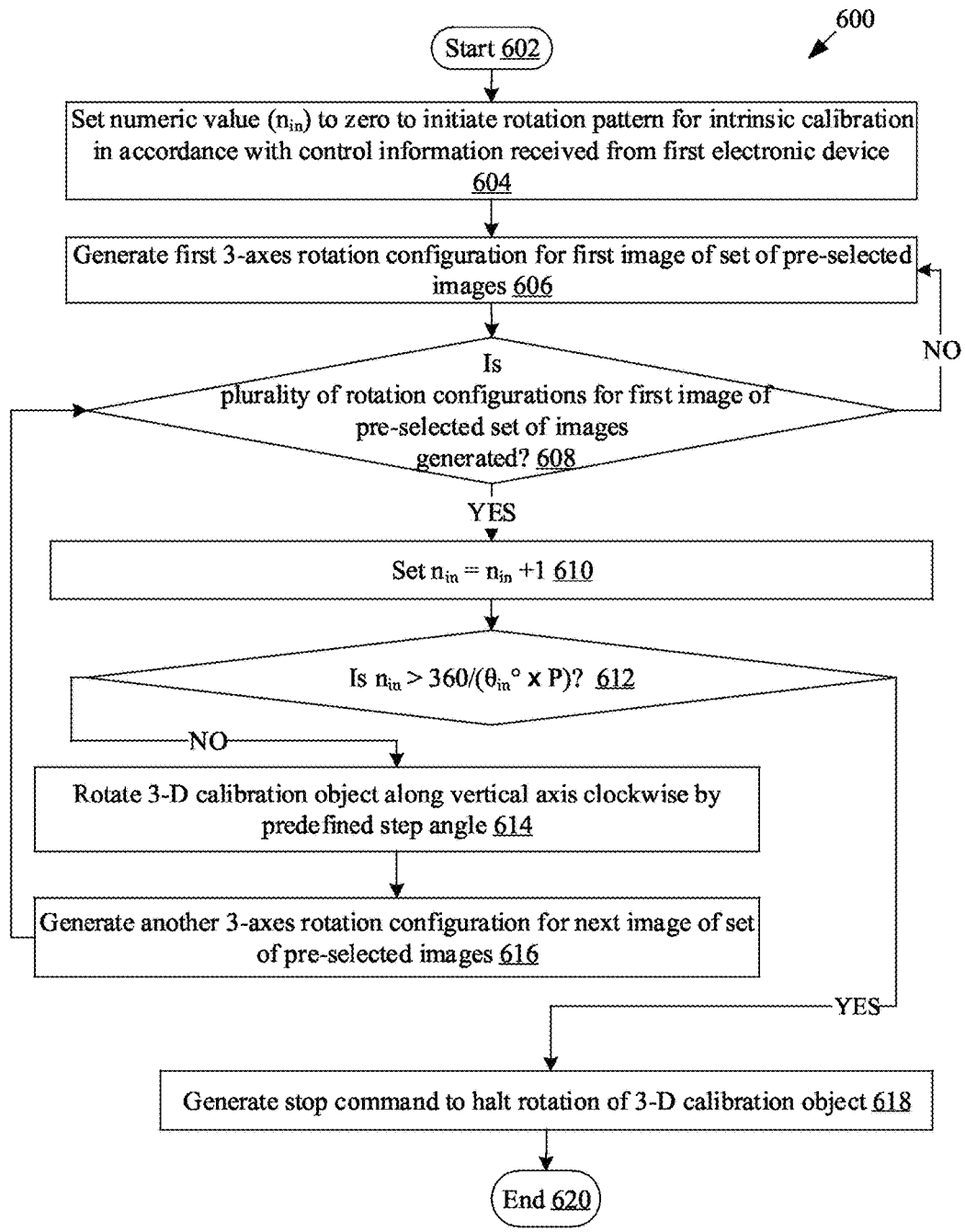
FIG. 6 illustrates a third flow chart related to a rotation pattern determined for calibration of intrinsic camera parameters for implementation of an exemplary method for camera calibration by use of a rotatable 3-D calibration object, in accordance with an embodiment of the disclosure.

FIG. 6 illustrates a third flow chart related to a rotation pattern for calibration of intrinsic camera parameters for implementation of an exemplary method for camera calibration by use of a rotatable 3-D calibration object, in accordance with an embodiment of the disclosure. With reference to FIG. 6, there is shown a flow chart 600. The flow chart 600 is described in conjunction with FIGS. 1A, 1B, 2, 3A, 3B, 4A, 4B, 5A and 5B. The method, in accordance with the flow chart 600, may be implemented in the second electronic device 104. The method starts at step 602 and proceeds to step 604.

At step 604, a numeric value "$n_{in}$" may be set to zero to initiate a rotation pattern for intrinsic calibration, in accordance with control information received from the first electronic device 102. At step 606, in instances when "$n_{in}$"="0", a first 3-axes rotation configuration for a first image of a set of pre-selected images, may be generated.

At step 608, it may be determined whether a plurality of rotation configurations for the first image of the pre-selected set of images is generated. In instances when all the possible rotation configurations for the first image of the set of pre-selected images are generated, the control may pass to step 610. In instances when all the possible rotation configurations for the first image of the set of pre-selected images are not generated, the control may pass back to step 606.

At step 610, the numeric value "$n_{in}$" may be increased by the numeric value "1" (that is "$n_{in}=n_{in}+1$"). At step 612, it may be determined whether the numeric value "$n_{in}$" is greater than a certain numeric value obtained by use of the mathematical expression (1), that is when "$n_{in}$">"$360/(\theta_{in}°\times P)$". In accordance with the mathematical expression (1), "$n_{in}$" is the numeric value, "P" is the number of façades with 2-D texture pattern 106A, and the unique identifier 106B on the 3-D calibration object 106, and "$\theta_{in}$" is a pre-defined step angle for intrinsic parameter calibration. In instances, when "$n_{in}$"≤"$360/(\theta_{in}°\times P)$", the control may pass to step 614. In instances when "$n_{in}$">"$360/(\theta_{in}°\times P)$", the control passes to step 618.

At step 614, the 3-D calibration object 106 may be rotated along a vertical axis clockwise by the pre-defined step angle ($\theta_{in}°$). At step 616, when "$n_{in}$"="$n_{in}+1$", another 3-axes rotation configuration for a next image of the set of pre-selected images, may be generated. The control may pass back to step 608. Thus, the rotation sequence may repeat at a certain degree along the vertical axis, given by the mathematical expression (2) ($n_{in}\times\theta_{in}°$). In accordance with an embodiment, the smaller the pre-defined step angle "$\theta_{in}°$", the more likely it is to match the sample images of the captured plurality of image frames with the learned image set. The process may repeat until a complete rotation is performed (that is when $n_{in}>360/(\theta_{in}°\times P)$) in accordance with the rotation pattern determined, based on all images of the set of pre-selected images for intrinsic camera parameters calibration. At step 618, a stop command to halt the rotation of the 3-D calibration object 106 may be generated. The control may then pass to end step 620.

Figure 7:
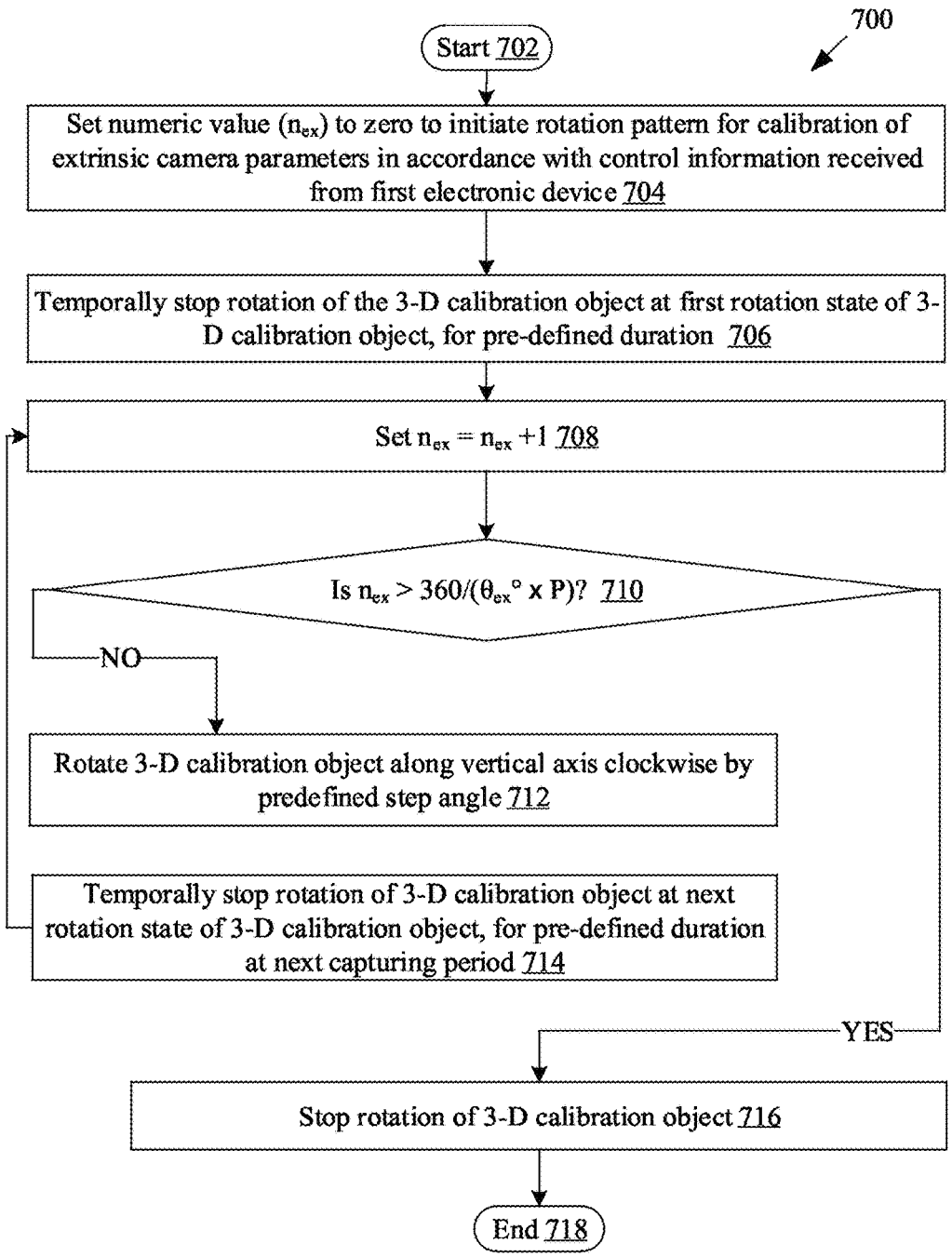
FIG. 7 illustrates a fourth flow chart related to another rotation pattern determined for calibration of extrinsic camera parameters for implementation of an exemplary method for camera calibration by use of a rotatable 3-D calibration object, in accordance with an embodiment of the disclosure.

FIG. 7 illustrates a fourth flow chart related to another rotation pattern for calibration of extrinsic camera parameters for implementation of an exemplary method for camera calibration by use of a rotatable 3-D calibration object, in accordance with an embodiment of the disclosure. With reference to FIG. 7, there is shown a flow chart 700. The flow chart 700 is described in conjunction with FIGS. 1A, 1B, and 2 to 6. The method, in accordance with the flow chart 700, may be implemented in the second electronic device 104. The method starts at step 702 and proceeds to step 704.

At step 704, a numeric value "$n_{ex}$" may be set to zero to initiate a rotation pattern for calibration of extrinsic camera parameters in accordance with control information received from the first electronic device 102. At step 706, in instances when "$n_{ex}$"="0", rotation of the 3-D calibration object 106 may be temporally stopped at a first rotation state of the 3-D calibration object 106, for a pre-defined duration. The pre-defined duration may be referred to as a first capturing period. A timestamp may be generated for the first rotation state of the 3-D calibration object 106.

At step 708, the numeric value "$n_{ex}$" may be increased by the numeric value "1" (that is "$n_{ex}=n_{ex}+1$"). At step 710, it may be determined whether the numeric value "$n_{ex}$" is greater than a certain numeric value obtained by use of the mathematical expression (3), that is when "$n_{ex}$">"$360/(\theta_{ex}°\times P)$". In accordance with the mathematical expression (3), "$n_{ex}$" is the numeric value used for calibration of extrinsic camera parameters, P is the number of façades with 2-D texture pattern 106A and the unique identifier 106B on the 3-D calibration object 106, and "$\theta_{ex}$" is a pre-defined step angle for extrinsic camera parameter calibration. In instances when "$n_{ex}$≤$360/(\theta ex°\times P)$", the control may pass to step 712. In instances when "$n_{ex}$>$360/(\theta_{ex}°\times P)$", the control passes to step 714.

At step 712, the 3-D calibration object 106 may be rotated along a vertical axis clockwise by the pre-defined step angle "$\theta_{ex}°$". At step 714, when "$n_{ex}$"="$n_{ex}+1$", rotation of the 3-D calibration object 106 may be temporarily stopped at a next rotation state of the 3-D calibration object 106. The rotation of the 3-D calibration object 106 may be temporarily stopped for the pre-defined duration that may be a next capturing period for the first electronic device 102 (when implemented as an imaging device) or the plurality of imaging devices 114A to 114D. A timestamp may be generated for each rotation state of the 3-D calibration object 106. The control may pass back to step 708. Thus, the rotation sequence may repeat at a certain degree along the vertical axis, given by the mathematical expression (4) ($n_{ex}\times\theta_{ex}°$). The process may repeat until a complete rotation is performed (that is when $n_{ex}>360/(\theta_{ex}°\times P)$) in accordance with the received control information from the first electronic device 102, which corresponds to the other rotation pattern determined for the extrinsic camera parameters calibration. At step 716, the rotation of the 3-D calibration object 106 may be stopped. The control may then pass to the end step 718.

In accordance with an embodiment of the disclosure, the system for camera calibration, by use of the rotatable 3-D calibration object 106, may comprise the first electronic device 102 (FIG. 1A). The first electronic device 102 may comprise one or more circuits, such as the processor 202 (FIG. 2). The processor 202 may be configured to determine a rotation pattern of the 3-D calibration object 106 (FIGS. 1A, 1B, and 3B). The rotation pattern may be determined based on a set of pre-selected images, such as the learned image set, which includes a 2-D texture pattern captured at pre-defined viewing angles. The processor 202 may be configured to communicate control information to the second electronic device 104, associated with the 3-D calibration object 106, to rotate the 3-D calibration object 106, in accordance with the determined rotation pattern. A plurality of image frames of the 3-D calibration object 106 may be captured to calibrate intrinsic and/or extrinsic camera parameters of the first electronic device 102.

Various embodiments of the disclosure may provide a non-transitory computer readable medium and/or storage medium, and/or a non-transitory machine readable medium and/or storage medium with a machine code stored thereon, and/or a set of instructions executable by a machine and/or a computer for camera calibration by use of the rotatable 3-D calibration object 106. The set of instructions in the first electronic device 102 may cause the machine and/or computer to perform the steps that include determination of a rotation pattern of the 3-D calibration object 106 (FIGS. 1A, 1B, and 3B). The rotation pattern may be determined based on a set of pre-selected images that may include a 2-D texture pattern captured at pre-defined viewing angles. Control information may be communicated to the second electronic device 104 (FIG. 1A), associated with the 3-D calibration object 106. The control information may be communicated to rotate the 3-D calibration object 106, in accordance with the determined rotation pattern. A plurality of image frames of the 3-D calibration object 106 may be captured to calibrate intrinsic and/or extrinsic camera parameters of the first electronic device 102.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system, is able to carry out these methods. Computer program, in the present context, means any expression, in any language, code or notation, of a set of instructions intended to cause a system that has an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

What is claimed is:

1. A camera calibration system, comprising:
   a second electronic device comprising first circuitry configured to rotate a three dimensional (3-D) calibration object based on first control information; and
   a first electronic device comprising second circuitry configured to:
      acquire a first set of images, wherein
         the first set of images is a set of pre-selected images,
         each of the first set of images comprises a two dimensional (2-D) texture pattern that corresponds to a first instance of capture of the 3-D calibration object,
         a viewing angle for capture of a first image of the first set of images is different from a viewing angle for capture of a second image of the first set of images, and
         the 2-D texture pattern indicates a plurality of feature points;
      detect the plurality of feature points of the 2-D texture pattern in the first set of images;
      select a second set of images from the first set of images, based on a quality threshold of the plurality of feature points, wherein the quality threshold is associated with the detection of the plurality of feature points in the first set of images;
      determine a first rotation pattern of the 3-D calibration object based on the second set of images;
      generate the first control information based on the first rotation pattern;
      communicate the first control information to the second electronic device to rotate the 3-D calibration object;
      obtain a plurality of image frames of the rotated 3-D calibration object, wherein each of the plurality of image frames corresponds to a second instance of capture of the rotated 3-D calibration object; and
      calibrate one of intrinsic camera parameters or extrinsic camera parameters of the first electronic device based on the plurality of image frames.

2. The camera calibration system according to claim 1, wherein the second circuitry is further configured to capture the plurality of image frames of the rotated 3-D calibration object.

3. The camera calibration system according to claim 1, wherein the first circuitry is further configured to:
   store the first control information in the second electronic device; and
   rotate the 3-D calibration object on one of a horizontal axis or a vertical axis, based on the first control information.

4. The camera calibration system according to claim 1, wherein the second circuitry is further configured to:
   determine an angle of capture of the plurality of image frames of the rotated 3-D calibration object; and
   capture the plurality of image frames of the rotated 3-D calibration object based on the angle of capture.

5. The camera calibration system according to claim 1, wherein the second circuitry is further configured to:
   receive position information of each of a plurality of imaging devices;
   determine an angle of capture for each of the plurality of imaging devices, based on the position information; and
   control each of the plurality of imaging devices to capture the plurality of image frames of the 3-D calibration object, based on the angle of capture.

6. The camera calibration system according to claim 1, wherein the 3-D calibration object comprises at least one facade, and
   wherein the at least one facade includes at least one of a unique identifier at a first position on the at least one facade or a sub-pattern that corresponds to the 2-D texture pattern.

7. The camera calibration system according to claim 6, wherein the second circuitry is further configured to detect at least one of the unique identifier or the sub-pattern in each of the plurality of image frames.

8. The camera calibration system according to claim 1, wherein the second circuitry is further configured to:
   receive the plurality of image frames of the 3-D calibration object from a plurality of imaging devices,
   wherein the plurality of image frames are captured by the plurality of imaging devices around the 3-D calibration object.

9. The camera calibration system according to claim 1, wherein the second circuitry is further configured to capture the plurality of image frames of the 3-D calibration object at a plurality of rotation states of the 3-D calibration object, and
   wherein a first rotation state of the plurality of rotation states is different from a second rotation state of the plurality of rotation states.

10. The camera calibration system according to claim 1, wherein the second circuitry is further configured to:
    compare a first distribution of the plurality of feature points in the 2-D texture pattern with a second distribution of the plurality of feature points of one of the second set of images; and determine, based on the comparison, a similarity associated with the first distribution of the plurality of feature points between each of the plurality of image frames and the one of the second set of images.

11. The camera calibration system according to claim 10, wherein the second circuitry is further configured to select one of the plurality of image frames based on the similarity.

12. The camera calibration system according to claim 1, wherein the second circuitry is further configured to:
   determine a second rotation pattern of the 3-D calibration object;
   generate second control information based on the second rotation pattern; and
   communicate the second control information to the second electronic device.

13. The camera calibration system according to claim 12, wherein the first circuitry is further configured to:
   rotate the 3-D calibration object based on the second control information; and
   generate a timestamp for each rotation state of the 3-D calibration object,
      wherein the timestamp for each rotation state corresponds to a time of capture of each of the plurality of image frames, and
   wherein the second circuitry is further configured to synchronize, at each step angle of rotation of the 3-D calibration object, the time of capture of each of the plurality of image frames to each rotation state of the 3-D calibration object, wherein the synchronization of the time of capture of each of the plurality of image frames to each rotation state of the 3-D calibration object is based on one of the first rotation pattern or the second rotation pattern.

14. The camera calibration system according to claim 13, wherein the second circuitry is further configured to:
   calibrate the intrinsic camera parameters based on the plurality of image frames;
   determine a plurality of 3-D world coordinates of the plurality of feature points on the 3-D calibration object; and
   determine a 2-D to 3-D map of each image frame of the plurality of image frames, based on:
      the synchronization of the time of capture to each rotation state,
      the calibrated intrinsic camera parameters, and
      the plurality of 3-D world coordinates of the plurality of feature points on the 3-D calibration object.

15. The camera calibration system according to claim 1, wherein the second circuitry is further configured to obtain the plurality of image frames of the rotated 3-D calibration object from a plurality of imaging devices that are communicatively coupled to the first electronic device.

16. A camera calibration method, comprising:
   acquiring, by a first electronic device, a first set of images, wherein
      the first set of images is a set of pre-selected images,
      each of the first set of images comprises a two dimensional (2-D) texture pattern that corresponds to a first instance of capture of a three-dimensional (3-D) calibration object,
      a viewing angle for capture of a first image of the first set of images is different from a viewing angle for capture of a second image of the first set of images, and
      the 2-D texture pattern indicates a plurality of feature points;
   detecting, by the first electronic device, the plurality of feature points in the 2-D texture pattern in the first set of images;
   selecting, by the first electronic device, a second set of images from the first set of images, based on a quality threshold of the plurality of feature points, wherein the quality threshold is associated with the detection of the plurality of feature points in the first set of images;
   determining, by the first electronic device, a first rotation pattern of the 3-D calibration object based on the second set of images;
   generating, by the first electronic device, first control information based on the first rotation pattern;
   communicating, by the first electronic device, the first control information to a second electronic device;
   rotating, by the second electronic device, the 3-D calibration object based on the first control information;
   obtaining, by the first electronic device, a plurality of image frames of the rotated 3-D calibration object, wherein each of the plurality of image frames corresponds to a second instance of capture of the rotated 3-D calibration object; and
   calibrating, by the first electronic device, one of intrinsic camera parameters or extrinsic camera parameters of the first electronic device based on the plurality of image frames.

17. The camera calibration method according to claim 16, further comprising detecting, by the first electronic device, at least one of a unique identifier or a sub-pattern in each of the plurality of image frames.

18. The camera calibration method according to claim 16, further comprising:
   comparing, by the first electronic device, a first distribution of the plurality of feature points in the 2-D texture pattern with a second distribution of the plurality of feature points of one of the second set of images; and
   determining, by the first electronic device, a similarity based on the comparison, wherein the similarity is associated with the first distribution of the plurality of feature points between each of the plurality of image frames and the one of the second set of images.

19. The camera calibration method according to claim 18, further comprising selecting, by the first electronic device, one of the plurality of image frames based on the similarity.

20. The camera calibration method according to claim 16, further comprising:
   determining, by the first electronic device, a second rotation pattern of the 3-D calibration object;
   generating, by the first electronic device, second control information based on the second rotation pattern; and
   communicating, by the first electronic device, the second control information to the second electronic device.

21. The camera calibration method according to claim 20, further comprising:
   rotating, by the second electronic device, the 3-D calibration object based on the second control information;
   generating, by the second electronic device, a timestamp for each rotation state of the 3-D calibration object,
      wherein the timestamp for each rotation state corresponds to a time of capture of each of the plurality of image frames; and
   synchronizing, by the first electronic device, at each step angle of rotation of the 3-D calibration object, the time of capture of each of the plurality of image frames to each rotation state of the 3-D calibration object, wherein the synchronization of the time of capture of each of the plurality of image frames to each rotation state of the 3-D calibration object is based on one of the first rotation pattern or the second rotation pattern.

22. The camera calibration method according to claim 21, further comprising:
- calibrating, by the first electronic device, the intrinsic camera parameters based on the plurality of image frames;
- determining, by the first electronic device, a plurality of 3-D world coordinates of the plurality of feature points on the 3-D calibration object; and
- determining, by the first electronic device, a 2-D to 3-D map of each image frame of the plurality of image frames, based on:
  - the synchronization of the time of capture to each rotation state,
  - the calibrated intrinsic camera parameters, and
  - the plurality of 3-D world coordinates of the plurality of feature points on the 3-D calibration object.

\* \* \* \* \*